(12) United States Patent
Kunihiro et al.

(10) Patent No.: US 9,656,686 B2
(45) Date of Patent: *May 23, 2017

(54) DRIVE SUPPORTING DEVICE, OPERATION DETECTING DEVICE, AND CONTROLLER

(71) Applicant: TOYOTA JIDOSHA KABUSHIKI KAISHA, Toyota-shi, Aichi (JP)

(72) Inventors: Yoji Kunihiro, Susono (JP); Takeshi Goto, Toyota (JP); Yoshiaki Suzuki, Sunto-gun (JP); Ikuo Kushiro, Susono (JP); Kimiaki Ono, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/432,086

(22) PCT Filed: Dec. 7, 2012

(86) PCT No.: PCT/JP2012/081851
§ 371 (c)(1),
(2) Date: Mar. 27, 2015

(87) PCT Pub. No.: WO2014/087546
PCT Pub. Date: Jun. 12, 2014

(65) Prior Publication Data
US 2015/0274201 A1   Oct. 1, 2015

(51) Int. Cl.
*B62D 5/04* (2006.01)
*B62D 6/10* (2006.01)
(Continued)

(52) U.S. Cl.
CPC .......... *B62D 5/0463* (2013.01); *B62D 1/286* (2013.01); *B62D 6/10* (2013.01); *B62D 15/025* (2013.01); *B62D 15/0235* (2013.01)

(58) Field of Classification Search
CPC .... B62D 5/0463; B62D 15/025; B62D 1/286; B62D 6/10; B62D 15/0235
See application file for complete search history.

(56) References Cited

U.S. PATENT DOCUMENTS 7,913,804 B2   3/2011  Ehara et al.
2003/0069675 A1 * 4/2003  Kifuku ................ B62D 5/0463
                                                           701/41
(Continued)

FOREIGN PATENT DOCUMENTS

DE    102012219260 A1   5/2013
JP    05-085379 A       4/1993
(Continued)

OTHER PUBLICATIONS

International Search Report for PCT/JP2012/081851 dated Feb. 5, 2013.
(Continued)

*Primary Examiner* — Adam Tissot
*Assistant Examiner* — Jordan S Fei
(74) *Attorney, Agent, or Firm* — Sughrue Mion, PLLC

(57) ABSTRACT

A drive supporting device includes a supporting device mounted on a vehicle and capable of executing driving support in the vehicle; a steering angle detecting device configured to detect a steering angle of a steering member of the vehicle; a torque detecting device configured to detect a torque acting on a steering shaft portion that rotates with the steering member; and a controller configured to control the supporting device, wherein the controller changes content of the driving support by the supporting device between a case in which a steering power corresponding to a product of a parameter associated with the steering angle detected by the steering angle detecting device and a parameter associated with the torque detected by the torque detecting device is greater than or equal to a reference value set in advance, and
(Continued)

a case in which the steering power is smaller than the reference value.

17 Claims, 17 Drawing Sheets

(51) Int. Cl.
 *B62D 1/28* (2006.01)
 *B62D 15/02* (2006.01)

(56) References Cited

U.S. PATENT DOCUMENTS

| | | |
|---|---|---|
| 2005/0067213 A1 | 3/2005 | Yasui et al. |
| 2006/0289226 A1 | 12/2006 | Sugitani |
| 2007/0062755 A1 | 3/2007 | Krieger et al. |
| 2012/0029774 A1 | 2/2012 | Fehlings et al. |
| 2012/0330510 A1 | 12/2012 | Kawase et al. |
| 2014/0180544 A1 | 6/2014 | Itamoto et al. |
| 2014/0222295 A1 | 8/2014 | Dornhege et al. |
| 2015/0025743 A1 | 1/2015 | Tamura et al. |
| 2015/0239495 A1 | 8/2015 | Kameda |
| 2015/0274201 A1 | 10/2015 | Kunihiro et al. |

FOREIGN PATENT DOCUMENTS

| | | |
|---|---|---|
| JP | 5-208684 A | 8/1993 |
| JP | 6-219312 A | 8/1994 |
| JP | 07-040756 A | 2/1995 |
| JP | 08-099647 A | 4/1996 |
| JP | 2003-63437 A | 3/2003 |
| JP | 2004-17881 A | 1/2004 |
| JP | 2004-175122 A | 6/2004 |
| JP | 2005-088754 A | 4/2005 |
| JP | 2009-262622 A | 11/2009 |
| JP | 2009-262652 A | 11/2009 |
| JP | 2010-111361 A | 5/2010 |
| JP | 2012-126359 A | 7/2012 |
| JP | 2013-112119 A | 6/2013 |
| KR | 10-0651144 B1 | 11/2006 |
| WO | 2014/087546 A1 | 6/2014 |

OTHER PUBLICATIONS

Communication dated Oct. 4, 2016, from the United States Patent and Trademark Office in U.S. Appl. No. 14/916,232.
An Office Action dated Nov. 7, 2016, which issued during the prosecution of U.S. Appl. No. 14/916,232.
Communication dated Jul. 29, 2016 from U.S. Patent & Trademark Office in counterpart U.S. Appl. No. 14/662,633.
Communication dated Oct. 8, 2015 from U.S. Patent & Trademark Office in counterpart U.S. Appl. No. 14/661,192.
Communication dated Apr. 1, 2016 from U.S. Patent & Trademark Office in counterpart U.S. Appl. No. 14/661,192.
Notice of Allowance dated Feb. 13, 2017, which issued during the prosecution of U.S. Appl. No. 14/662,633.

\* cited by examiner

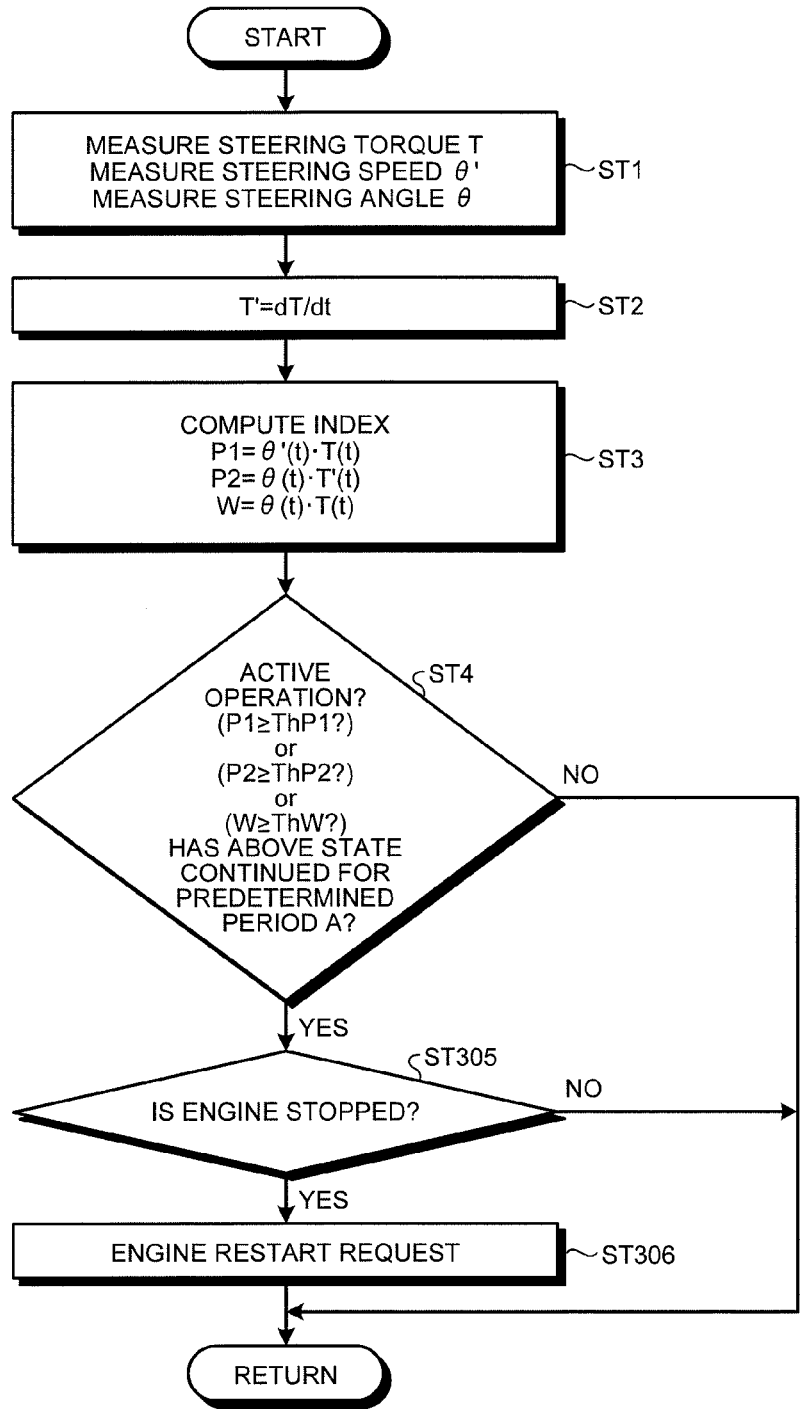

DRIVE SUPPORTING DEVICE, OPERATION DETECTING DEVICE, AND CONTROLLER

CROSS REFERENCE TO RELATED APPLICATIONS

This application is a National Stage of International Application No. PCT/JP2012/081851 filed Dec. 7, 2012, the contents of all of which are incorporated herein by reference in their entirety.

FIELD

The present invention relates to a drive supporting device, an operation detecting device, and a controller.

BACKGROUND

Patent Literature 1, for example, discloses a wheel steering state detecting device as a conventional drive supporting device, an operation detecting device, and a controller mounted on a vehicle. The wheel steering state detecting device detects a wheel steering state (time of steering, time of hands free, time of steering-hold, etc.) by the driver according to the amount of work, which is obtained by integrating the product of a time differential value of a steering angle and a steering torque.

CITATION LIST

Patent Literature

Patent Literature 1: Japanese Patent Application Laid-open No. 2004-175122

SUMMARY

Technical Problem

Meanwhile, the wheel steering state detecting device described in Patent Literature 1, for example, has room for improvement to carry out driving support that further reflects the intention of the driver when carrying out the driving support corresponding to the detection result.

In light of the foregoing circumstances, it is an object of the present invention to provide a drive supporting device, an operation detecting device, and a controller that can realize the driving support reflecting the intention of the driver.

Solution to Problem

In order to achieve the above mentioned object, a drive supporting device according to the present invention includes a supporting device mounted on a vehicle and capable of executing driving support in the vehicle; a steering angle detecting device configured to detect a steering angle of a steering member of the vehicle; a torque detecting device configured to detect a torque acting on a steering shaft portion that rotates with the steering member; and a controller configured to control the supporting device, wherein the controller changes content of the driving support by the supporting device between a case in which a steering power based on a sum of a product of a steering speed corresponding to the steering angle torque detected by the torque detecting device, and a product of the steering angle detected by the steering angle detecting device and a torque differential value corresponding to the torque detected by the torque detecting device is greater than or equal to a reference value set in advance, and a case in which the steering power is smaller than the reference value.

Further, in the drive supporting device, it is possible to configure that the supporting device is configured to include a steering actuator that operates according to a steering operation on the steering member, and at the time the steering power is greater than or equal to the reference value, the controller controls the steering actuator and reduces a degree of the driving support of suppressing the steering operation on the steering member compared to at the time the steering power is smaller than the reference value.

Further, in the drive supporting device, it is possible to configure that at the time the steering power is greater than or equal to the reference value, the controller controls the steering actuator and reduces a dumping force generated by the steering actuator compared to at the time the steering power is smaller than the reference value.

Further, in the drive supporting device, it is possible to configure that the controller changes a control amount of the steering actuator based on the steering power and a vehicle speed of the vehicle.

Further, in the drive supporting device, it is possible to configure that at the time a period in which an amplitude of the steering power is greater than or equal to an amplitude threshold value defined in advance has continued longer than or equal to a predetermined period set in advance, the controller increases at least one of an assist force generated by the steering actuator, a dumping force generated by the steering actuator, and a frictional force generated by the steering actuator compared to at the time the amplitude of the steering power is smaller than the amplitude threshold value or at the time a period in which the amplitude of the steering power is greater than or equal to the amplitude threshold value is shorter than the predetermined period.

Further, in the drive supporting device, it is possible to configure that the controller keeps an assist correction amount, which is a correction amount of the assist force generated by the steering actuator, or a dumping correction amount, which is a correction amount of the dumping force generated by the steering actuator, constant at the time an absolute value of the steering power is smaller than or equal to a predetermined power set in advance, and changes the assist correction amount or the dumping correction amount with increase in the absolute value of the steering power at the time the absolute value of the steering power is greater than the predetermined power.

Further, in the drive supporting device, it is possible to configure that the supporting device is configured to include an operation unit that carries out the driving support by automatically starting and stopping a power source that generates power for causing the vehicle to travel, and the controller carries out the driving support of starting the power source at the time the steering power is greater than or equal to the reference value, and does not carry out the driving support of starting the power source at the time the steering power is smaller than the reference value.

Further, in the drive supporting device, it is possible to configure that the controller changes the content of the driving support by the supporting device based on a steering work amount corresponding to a product of a parameter associated with the steering angle detected by the steering angle detecting device and a parameter associated with the torque detected by the torque detecting device.

Further, in the drive supporting device, it is possible to configure that the steering power is calculated based on one of or both of a product of a steering speed corresponding to the steering angle detected by the steering angle detecting device and the torque detected by the torque detecting device, and a product of the steering angle detected by the steering angle detecting device and a torque differential value corresponding to the torque detected by the torque detecting device.

Further, in the drive supporting device, it is possible to configure that the amplitude of the steering power is calculated based on a difference of a maximum value and a minimum value of the steering power, an absolute value of the maximum value of the steering power, or an absolute value of the minimum value of the steering power.

Further, in the drive supporting device, it is possible to configure that the controller provides driving support corresponding to an active operation on the steering member at the time the steering power is greater than or equal to the reference value, and provides driving support corresponding to a passive operation on the steering member at the time the steering power is smaller than the reference value.

In order to achieve the above mentioned object, an operation detecting device includes a steering angle detecting device configured to detect a steering angle of a steering member of a vehicle; a torque detecting device configured to detect a torque acting on a steering shaft portion that rotates with the steering member; and a determining device configured to determine an active operation on the steering member and a passive operation on the steering member on the basis of a steering power based on a sum of a product of a steering speed corresponding to the steering angle detected by the steering angle detecting device and the torque detected by the torque detecting device and a product of the steering angle detected by the steering angle detecting device and a torque differential value corresponding to the torque detected by the torque detecting device.

Further, in the operation detecting device, it is possible to configure that the active operation includes a steering operation in which a driver attempts to move the vehicle to a target position, and the passive operation includes a steering operation in which the driver attempts to maintain the vehicle at a target position with respect to disturbance, a hands free operation, or a steering-hold operation.

Further, in the operation detecting device, it is possible to configure that the determining device determines the active operation and the passive operation based on a steering power corresponding to a product of a parameter associated with the steering angle detected by the steering angle detecting device and a parameter associated with the torque detected by the torque detecting device, and the steering power is calculated based on one of or both of a product of a steering speed corresponding to the steering angle detected by the steering angle detecting device and the torque detected by the torque detecting device, and a product of the steering angle detected by the steering angle detecting device and a torque differential value corresponding to the torque detected by the torque detecting device.

Further, in the operation detecting device, it is possible to configure that the determining device determines correction steering with respect to disturbance at the time a period in which an amplitude of the steering power is greater than or equal to an amplitude threshold value defined in advance has continued longer than or equal to a predetermined period set in advance.

Further, in the operation detecting device, it is possible to configure that the determining device determines the active operation and the passive operation based on a steering work amount corresponding to a product of a parameter associated with the steering angle detected by the steering angle detecting device and a parameter associated with the torque detected by the torque detecting device.

Further, in the operation detecting device, it is possible to configure that the steering work amount is calculated based on a product of the steering angle calculated according to a yaw rate of the vehicle as the parameter associated with the steering angle detected by the steering angle detecting device, and the torque detected by the torque detecting device, and the determining device determines the active operation and the passive operation based on the steering work amount.

Further, in the operation detecting device, it is possible to configure that the steering work amount is calculated based on a product of a steering angle corresponding to a difference of the steering angle detected by the steering angle detecting device and a steering angle at time of straight-ahead travelling of the vehicle, or a steering angle corresponding to a difference of the steering angle detected by the steering angle detecting device and a steering angle calculated according to the yaw rate of the vehicle, as the parameter associated with the steering angle detected by the steering angle detecting device, and the torque detected by the torque detecting device, and the determining device determines the correction steering with respect to the disturbance based on the steering work amount.

In order to achieve the above mentioned object, an operation detecting device according to the present invention includes a steering angle detecting device configured to detect a steering angle of a steering member of a vehicle; a torque detecting device configured to detect a torque acting on a steering shaft portion that rotates with the steering member; and a determining device configured to determine correction steering with respect to disturbance based on an amplitude of a steering power corresponding to a product of a parameter associated with the steering angle detected by the steering angle detecting device and a parameter associated with the torque detected by the torque detecting device.

In order to achieve the above mentioned object, a controller according to the present invention is configured to be mounted on a vehicle and control a supporting device capable of executing driving support in the vehicle, wherein content of the driving support by the supporting device is changed between a case in which a steering power based on a sum of a product of a steering speed corresponding to a steering angle of a steering member of the vehicle and a torque acting on a steering shaft portion that rotates with the steering member, and a product of the steering angle of the steering member and a torque differential value corresponding to the torque acting on the steering shaft portion is greater than or equal to a reference value set in advance, and a case in which the steering power is smaller than the reference value.

Advantageous Effects of Invention

The drive supporting device, the operation detecting device, and the controller according to the present invention have such an effect that the driving support reflecting the intention of the driver can be realized.

BRIEF DESCRIPTION OF DRAWINGS

FIG. 20 is a flowchart describing one example of a control by the ECU according to the third embodiment.

DESCRIPTION OF EMBODIMENTS

Hereinafter, an embodiment of the invention will be described in detail with reference to the drawings. Furthermore, the invention is not limited to the embodiment. Further, the components of the embodiment below include a component that may be easily replaced by the person skilled in the art or a component that substantially has the same configuration.

[First Embodiment]

Figure 1:
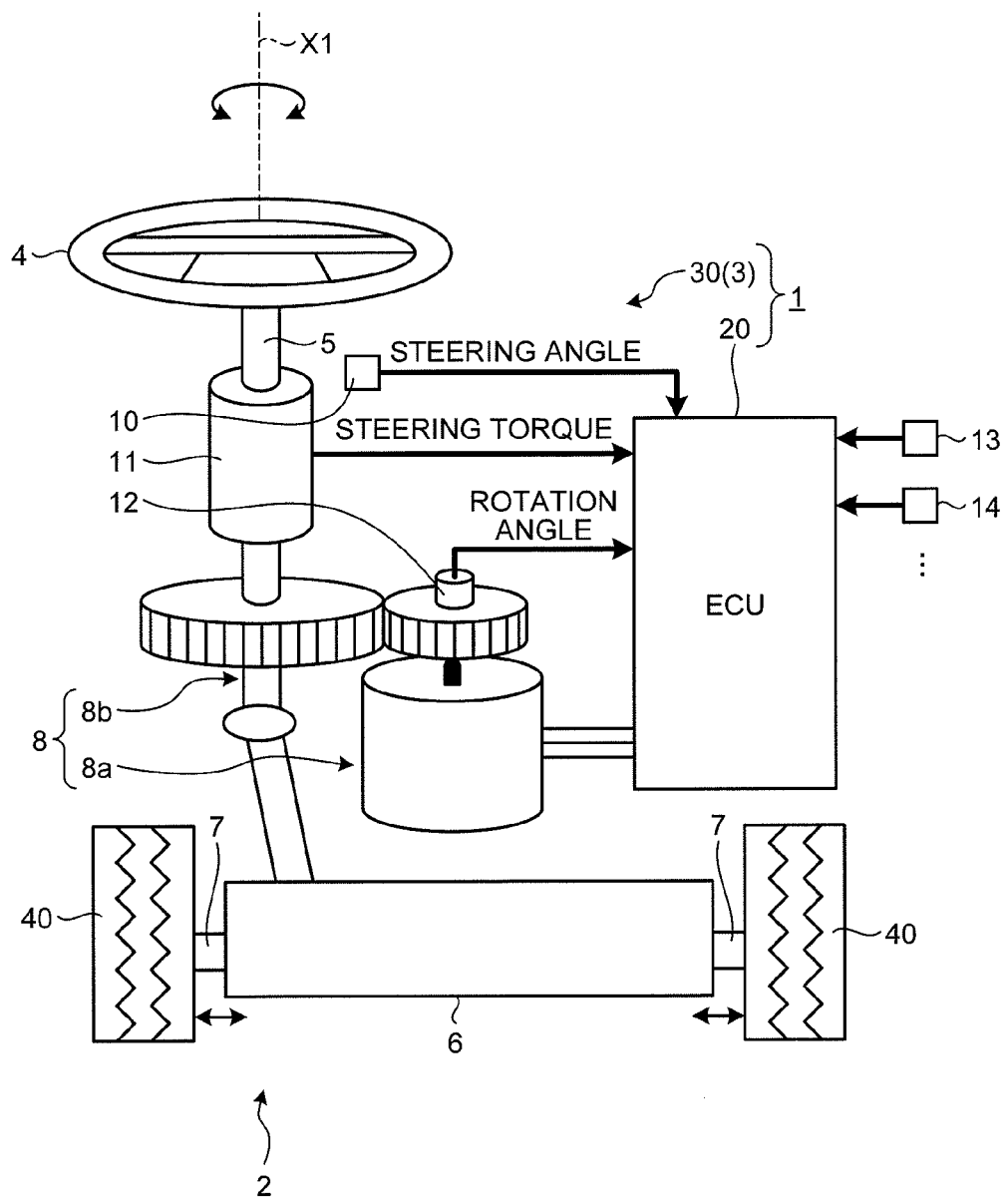
FIG. 1 is a schematic configuration view illustrating a schematic configuration of a drive supporting device according to a first embodiment.
Figure 2:
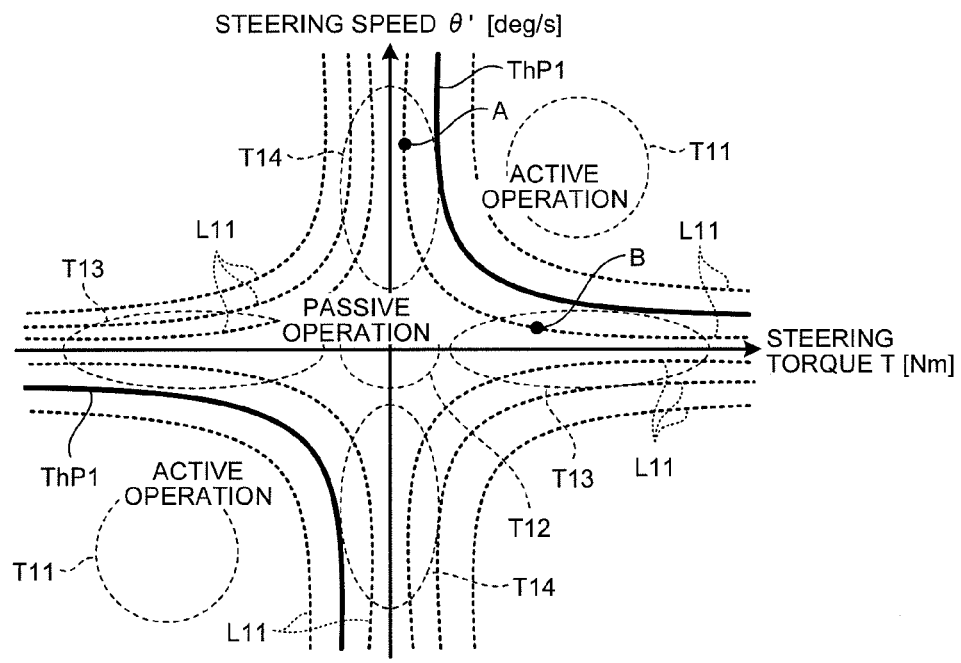
FIG. 2 is a diagrammatic view describing the significance represented by a steering power in the drive supporting device according to the first embodiment.
Figure 3:
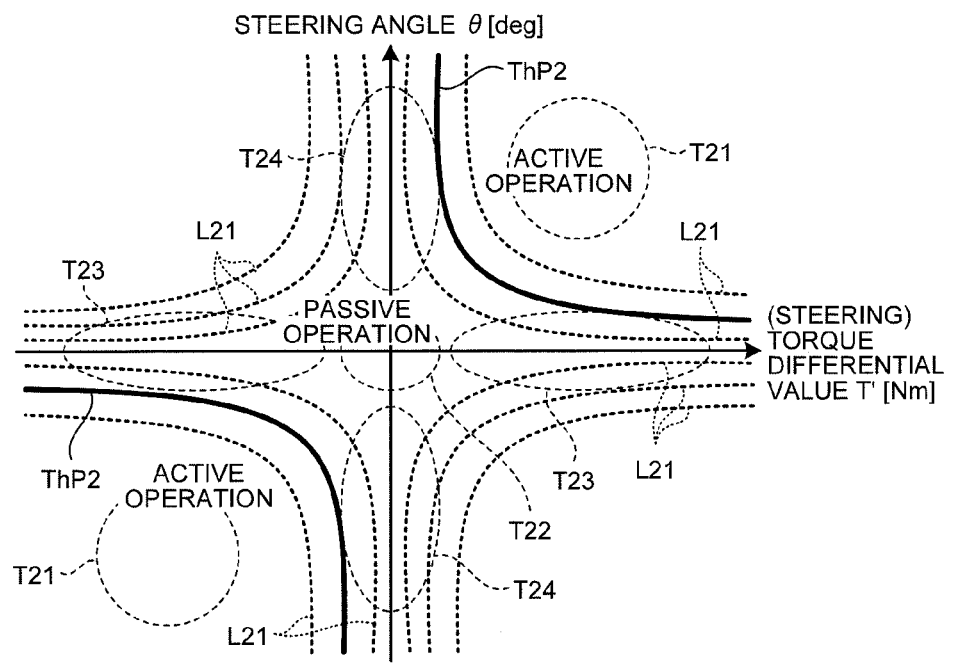
FIG. 3 is a diagrammatic view describing the significance represented by a steering power in the drive supporting device according to the first embodiment.
Figure 4:
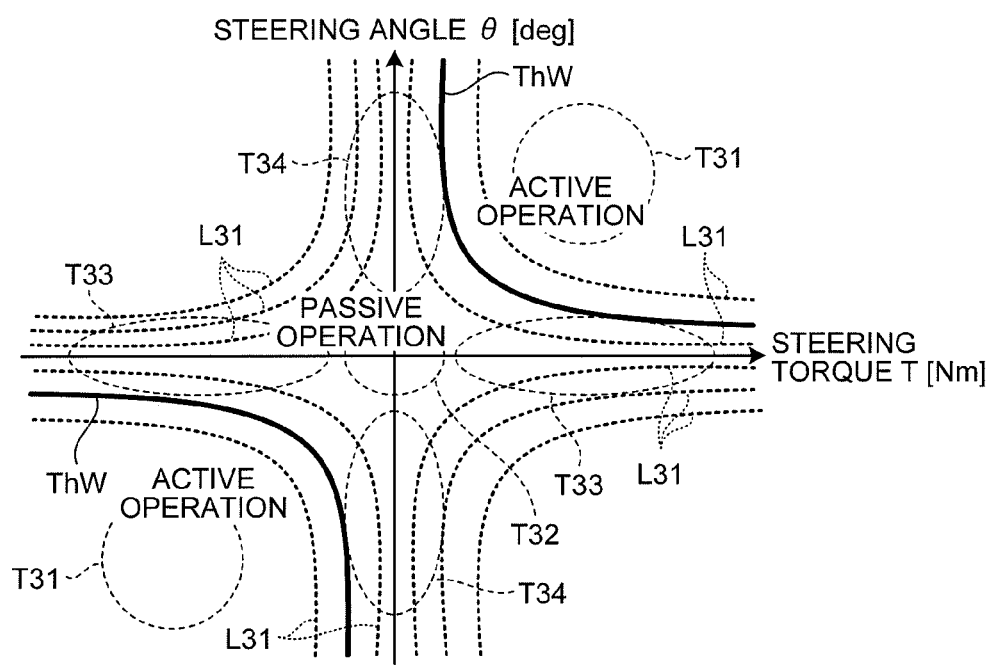
FIG. 4 is a diagrammatic view describing the significance represented by a steering work amount in the drive supporting device according to the first embodiment.
Figure 5:
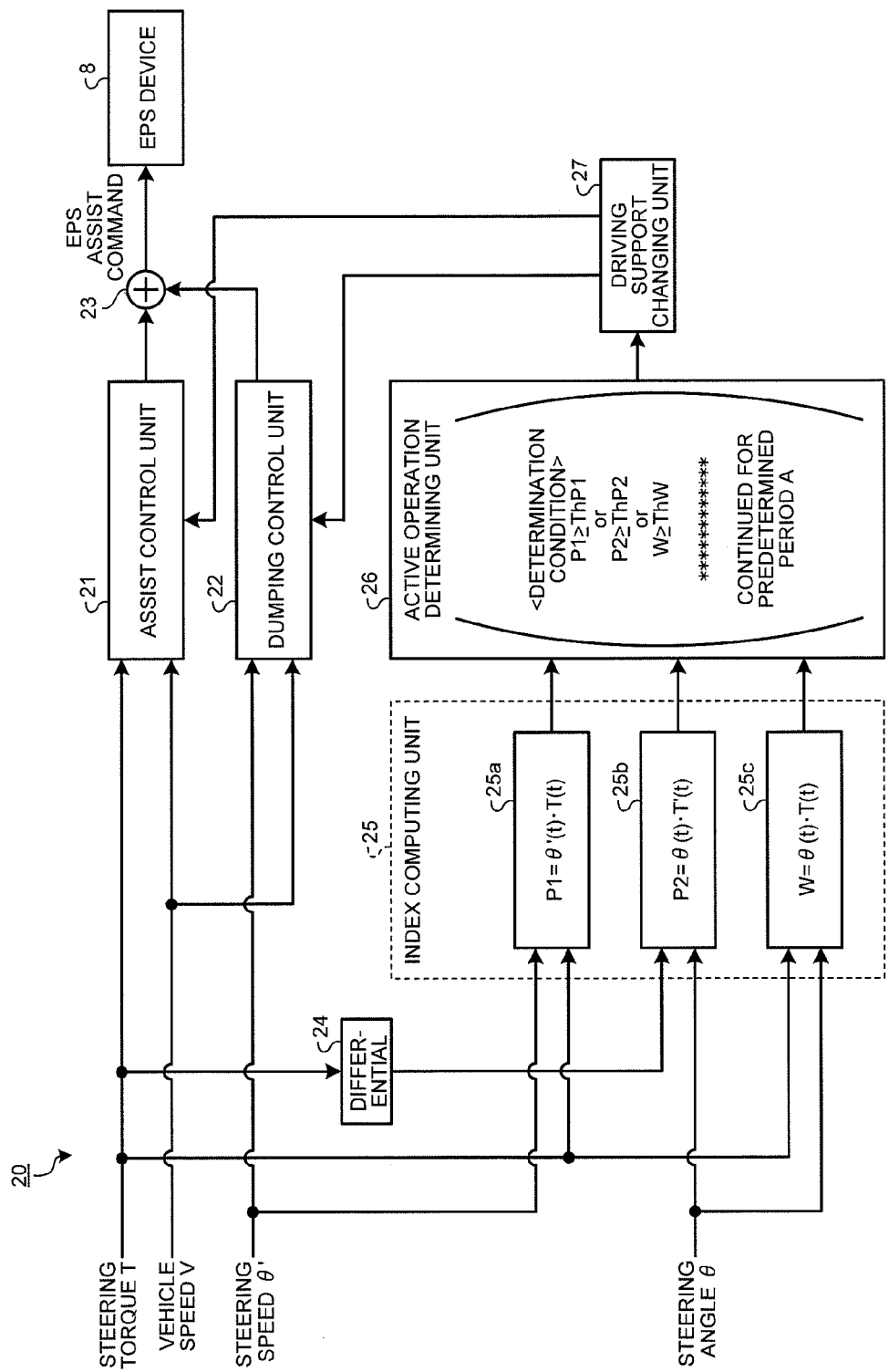
FIG. 5 is a block diagram illustrating one example of a schematic configuration of an ECU according to the first embodiment.
Figure 6:
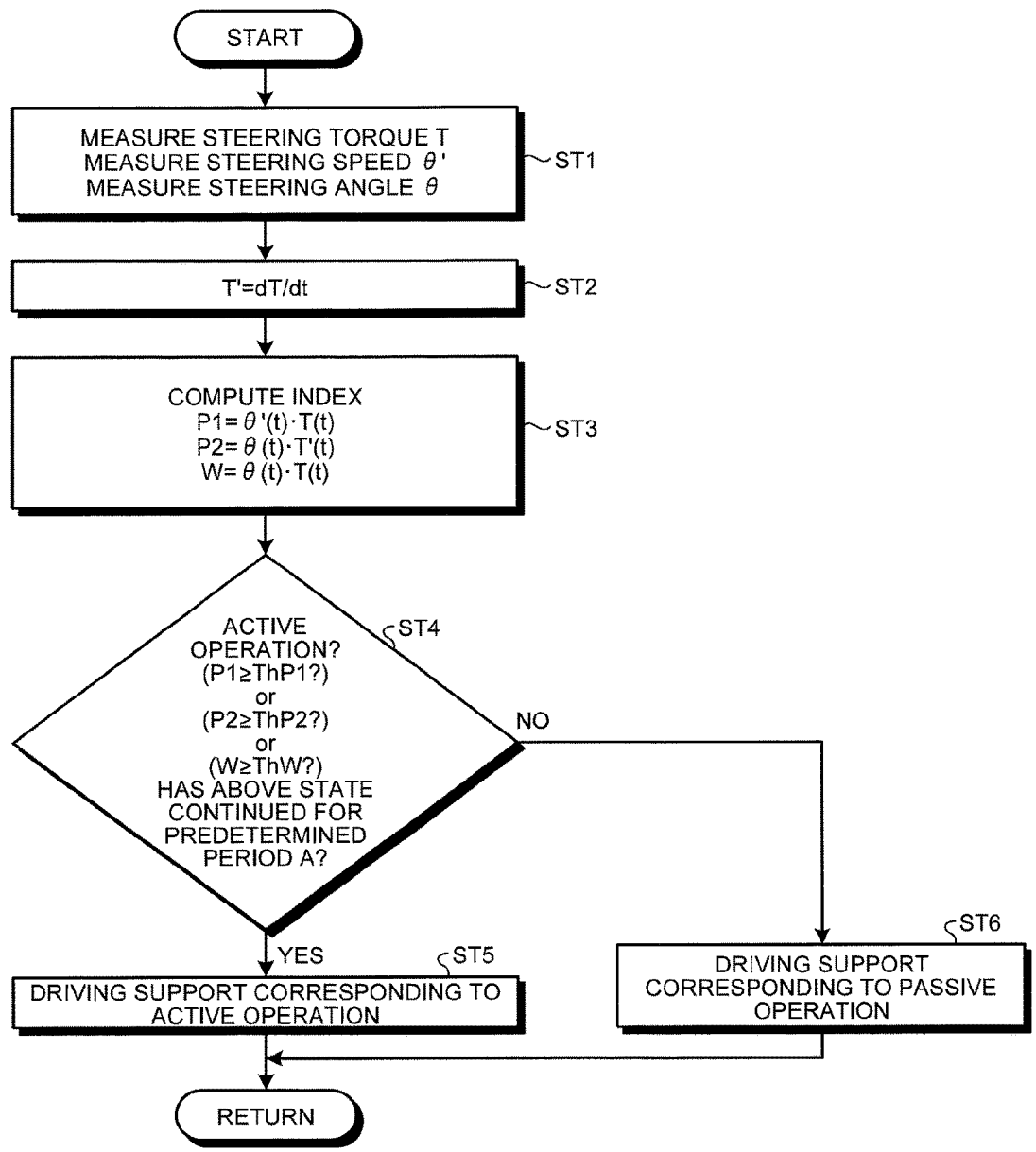
FIG. 6 is a flowchart describing one example of a control by the ECU according to the first embodiment.
Figure 7:
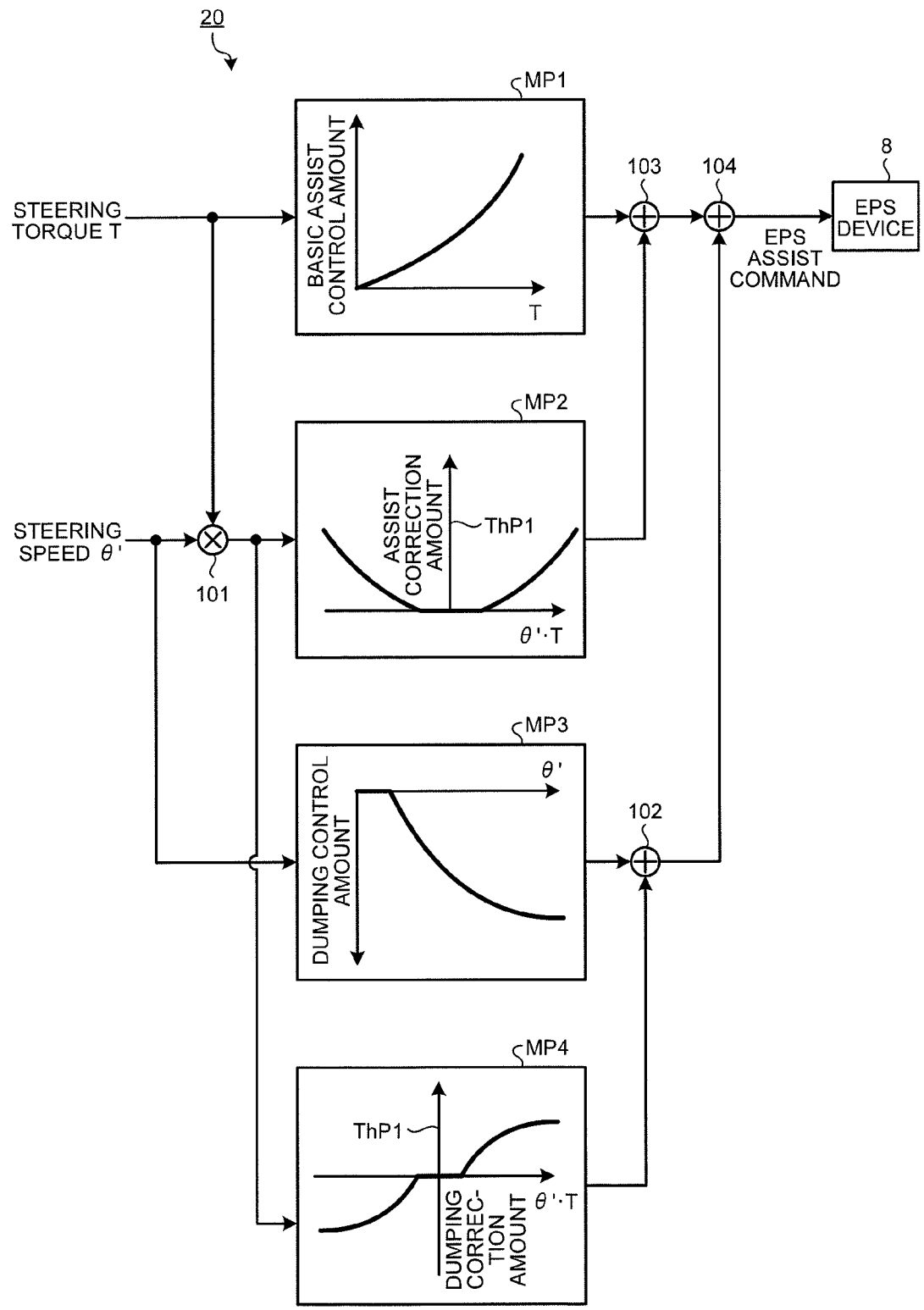
FIG. 7 is a block diagram illustrating one example of a schematic configuration of the ECU according to the first embodiment.
Figure 8:
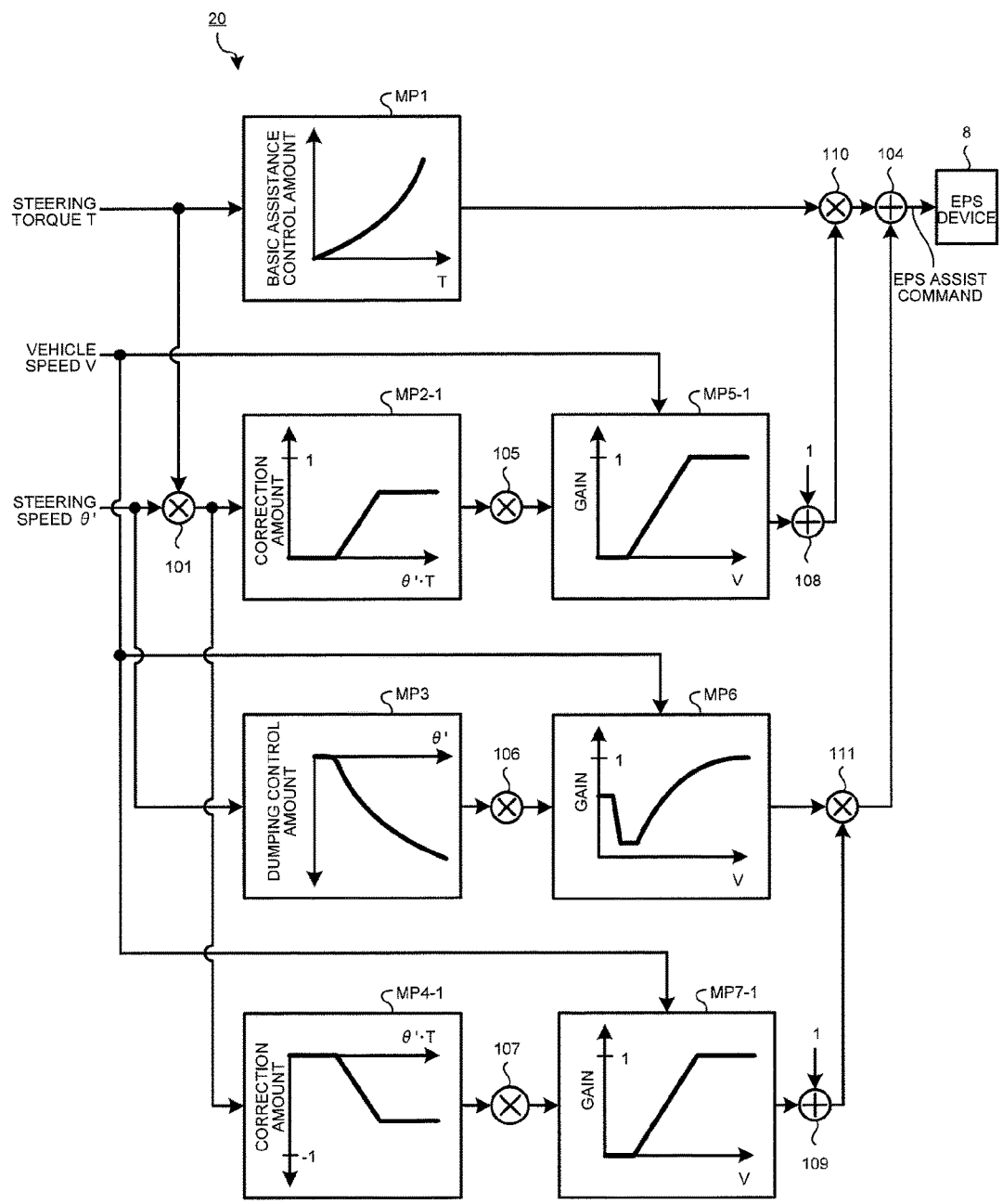
FIG. 8 is a block diagram illustrating one example of a schematic configuration of the ECU according to the first embodiment.
Figure 9:
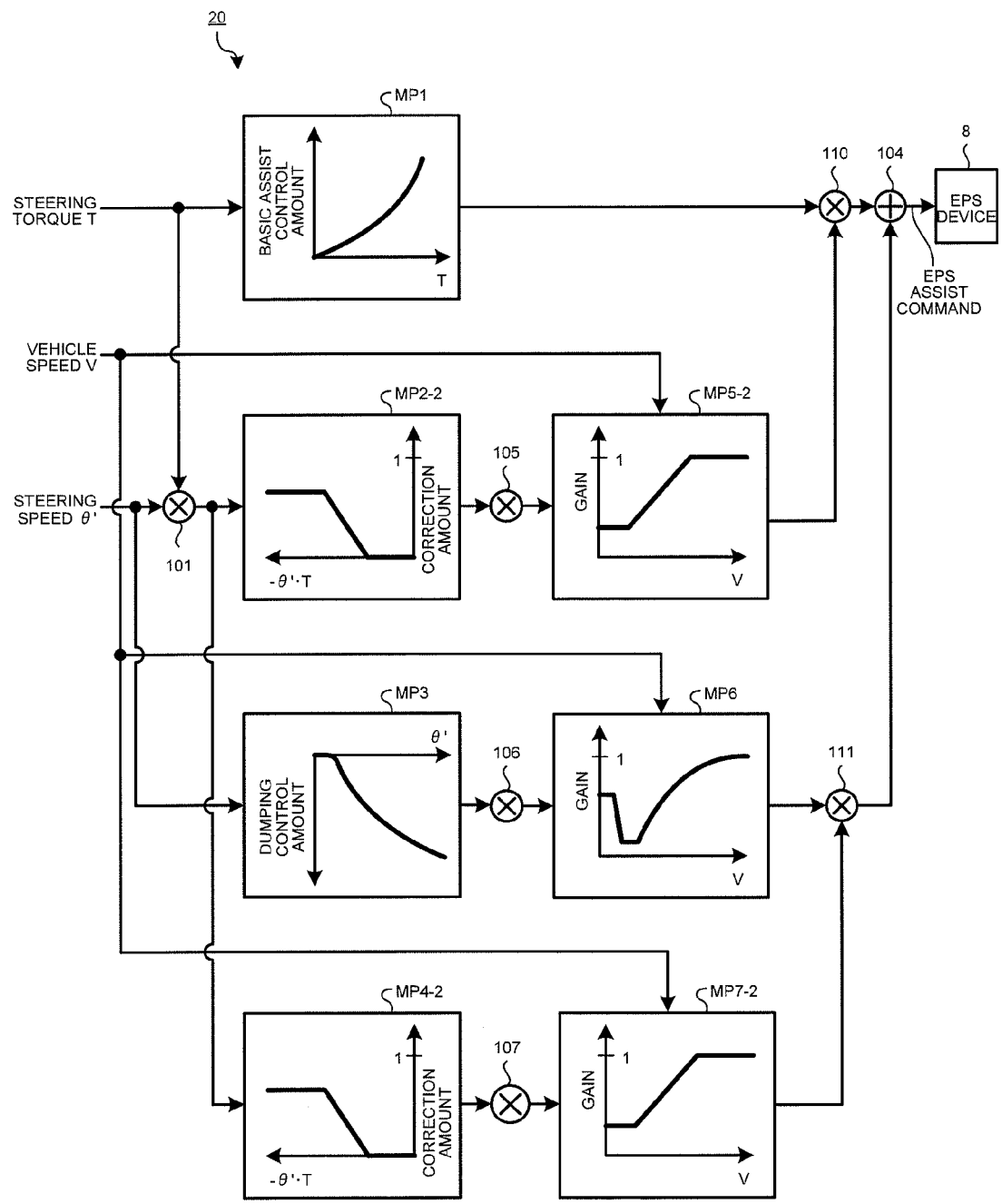
FIG. 9 is a block diagram illustrating one example of a schematic configuration of the ECU according to the first embodiment.

FIG. 1 is a schematic configuration view illustrating a schematic configuration of a drive supporting device according to a first embodiment. FIG. 2 and FIG. 3 are diagrammatic views describing the significance represented by a steering power in the drive supporting device according to the first embodiment. FIG. 4 is a diagrammatic view describing the significance represented by a steering work amount in the drive supporting device according to the first embodiment. FIG. 5 is a block diagram illustrating one example of a schematic configuration of an ECU according to the first embodiment. FIG. 6 is a flowchart describing one example of a control by the ECU according to the first embodiment. FIG. 7, FIG. 8, and FIG. 9 are block diagrams illustrating one example of a schematic configuration of the ECU according to the first embodiment.

A drive supporting device 1 of the present embodiment illustrated in FIG. 1 is mounted on a vehicle 2, and has a function as an operation detecting device that is capable of executing driving support in the vehicle 2 and that detects the operational intention of the driver based on information of a steering system of the vehicle 2. The drive supporting device 1 typically determines, in a distinguished manner, an active operation on a steering member and a passive operation on the steering member as an operation reflecting the operational intention of the driver based on a predetermined index corresponding to the information of the steering system. The drive supporting device 1 then realizes the driving support reflecting the intention of the driver by reflecting the determination result in various controls in the vehicle 2.

Here, the active operation on the steering member is typically an operation in which the operational intention of the driver is relatively strongly reflected. The passive operation on the steering member is, on the other hand, typically an operation in which the steering intention of the driver is relatively weakly reflected, for example, a negative operation corresponding to disturbance and stability compensation. More specifically, the active operation on the steering member may include, for example, a positive steering operation in which the driver attempts to move the vehicle 2 to a target position. The active operation is, typically, a state of actively carrying out work, or a state in which so-called myoelectricity is being generated, a state in which a command is actively being output from the brain, and the like, and for example, is an operation of gripping the steering member and putting force to steer the steering member thus shifting the vehicle 2 from a straight-ahead advancing state to a turning state. The passive operation on the steering member, on the other hand, may include a steering operation in which the driver attempts to maintain the vehicle 2 at a target position with respect to disturbance, a hands free operation in which the hand is freed from the steering member, a steering-hold operation in which the steering member is held to maintain the advancing direction of the vehicle 2 constant, and the like, for example. The passive operation is, for example, an operation that can correspond to road surface disturbance and the like by placing the hand on the steering member.

The drive supporting device 1 of the present embodiment reflects the determination result of the active operation and the passive operation based on the steering power in a driving support control of the steering system of the vehicle 2. The drive supporting device 1 thereby carries out, for example, the control (e.g., assist control, dumping control, hysteresis applying control, etc.) associated with maintaining the steering performance that does not depend on the properties of the driver.

Specifically, as illustrated in FIG. 1, the drive supporting device 1 includes a supporting device 3 mounted on the vehicle 2 and capable of executing the driving support in the vehicle 2, a steering angle sensor 10 serving as a steering angle detecting device, a torque sensor 11 serving as a torque detecting device, and an ECU 20 serving as a controller that controls the supporting device 3. The steering angle sensor 10 detects a steering angle of a steering wheel (hereinafter simply referred to as a "steering" unless particularly stated otherwise) 4 serving as the steering member of the vehicle 2. The torque sensor 11 detects the torque acting on a steering shaft (hereinafter simply referred to as a "shaft" unless particularly stated otherwise) 5 serving as a steering shaft portion that rotates with the steering 4. The ECU 20 is also used as a determining device of the operation detecting device. The supporting device 3 of the present embodiment is configured to include a steering device 30 configuring the steering system of the vehicle 2.

Here, the steering device 30 is a device mounted on the vehicle 2 to steer a steering wheel 40 of the vehicle 2. The steering device 30 of the present embodiment is a so-called electrical power steering device (EPS: Electronic Power Steering) that aids the steering force of the vehicle 2 with power from an electrical motor, and the like. The steering device 30 drives the electrical motor and the like to obtain a steering auxiliary force corresponding to the steering force exerted on the steering 4 from the driver to aid the steering operation (steering operation) of the driver.

Specifically, as illustrated in FIG. 1, the steering device 30 includes the steering 4 serving as the steering member, the shaft 5 serving as the steering shaft portion, an R & P gear mechanism (hereinafter simply referred to as a "gear mechanism" unless particularly described otherwise) 6, a pair of left and right tie rods 7, and an EPS device 8 serving as a steering actuator.

The steering 4 is a member that is rotatably operable in a direction about a rotation axis line X1, and is arranged at a driver's seat of the vehicle 2. The driver can perform the steering operation (steering operation) by rotatably operating the steering 4 with the rotation axis line X1 as the center of rotation. That is, in the vehicle, on which the steering device 30 is mounted, the steering wheel 40 is steered (rolled) when the steering 4 is operated by the driver.

The shaft 5 serves as the rotation shaft unit of the steering 4. The shaft 5 has one end coupled to the steering 4 and the other end coupled to the gear mechanism 6. That is, the steering 4 is connected to the gear mechanism 6 via the shaft 5. The shaft 5 is rotatable in a direction about the center axis line with the steering 4 accompanying the rotational operation of the steering 4 by the driver. The shaft 5, for example, may be divided into a plurality of members such as an upper shaft, an intermediate shaft, and a lower shaft.

The gear mechanism 6 mechanically couples the shaft 5 and the pair of tie rods 7. The gear mechanism 6, for example, has a so-called rack and pinion type gear mechanism, and converts the rotational movement in the direction about the center axis line of the shaft 5 to the linear movement in the left and right direction (typically corresponds to the vehicle width direction of the vehicle 2) of the pair of tie rods 7.

The pair of tie rods 7 have basal ends coupled to the gear mechanism 6 respectively, and tie rod ends, which form distal ends, coupled to each steering wheel 40 via a knuckle arm. That is, the steering 4 is coupled to each steering wheel 40 via the shaft 5, the gear mechanism 6, each tie rod 7, and the like.

The EPS device 8 configures the supporting device 3, and is a steering actuator that operates according to the steering operation on the steering 4. The EPS device 8 aids the steering operation (steering operation) on the steering 4 by the driver, and generates the torque for aiding the steering operation. The EPS device 8 outputs a steering auxiliary force (assist torque) for aiding the steering force (torque) input to the steering 4 by the driver. In other words, the EPS device 8 assists the steering operation of the driver by driving the steering wheel 40 of the vehicle 2 with the electrical motor, and the like. The EPS device 8 assists the steering operation of the driver by causing an assist torque to act on the shaft 5. Here, the assist torque is a torque that aids the torque corresponding to the steering force input to the steering 4 by the driver.

The EPS device 8 here includes a motor 8a serving as the electrical motor, and a decelerator 8b. The EPS device 8 of the present embodiment, for example, is a column EPS device in which the motor 8a is arranged on the shaft 5 such as the intermediate shaft, that is, a so-called column assist type assist mechanism.

The motor 8a is a column assist electrical motor that generates rotative power (motor torque) when power is supplied, and for example, generates the assist torque as the steering auxiliary force. The motor 8a is connected to the shaft 5 in a power transmissible manner via the decelerator 8b, and the like, and imparts the steering auxiliary force to the shaft 5 via the decelerator 8b, and the like. The decelerator 8b decelerates the rotative power of the motor 8a, and transmits the power to the shaft 5.

The EPS device 8 rotatably drives the motor 8a, so that the rotative power (torque) generated by the motor 8a is transmitted to the shaft 5 via the decelerator 8b, thus carrying out steering assist. In this case, the rotative power generated by the motor 8a is decelerated by the decelerator 8b and transmitted to the shaft 5 with the torque increased. The EPS device 8 is electrically connected to the ECU 20, to be described later, so that the drive of the motor 8a is controlled.

The steering angle sensor 10 detects the steering angle of the steering 4, as described above, and is a rotation angle sensor in the steering system. The steering angle sensor 10 detects the steering angle as an absolute angle here. The steering angle sensor 10 detects the steering angle (wheel steering angle), which is the rotation angle of the steering 4. The steering angle detected by the steering angle sensor 10 is detected with the counterclockwise side as a positive value and the clockwise side as a negative value, with a neutral position of the steering 4 as a reference, for example, but may be detected in a manner opposite thereto. It is to be noted that the neutral position of the steering 4 is a position to become a reference of the steering angle, and is typically a position of the steering 4 of when the vehicle 2 travels straight-ahead. The steering angle detected by the steering angle sensor 10 becomes 0° at the neutral position of the steering 4. The steering angle sensor 10 is electrically connected to the ECU 20, and outputs a detection signal corresponding to the detected steering angle to the ECU 20.

It is to be noted that the steering angle detecting device of the drive supporting device 1 is not limited to the steering angle sensor 10, and for example, a rotation angle sensor 12 that detects the rotation angle of a rotor shaft of the motor 8a, a sensor (not illustrated) that detects a rack stroke or a pinion rotation angle of the gear mechanism 6, a sensor (not illustrated) that detects a cut angle of the steering wheel 40, and the like may be used. In this case, the steering angle detecting device may separately have a function capable of acquiring the absolute angle of the steering 4 if it is a sensor that detects the steering angle as a relative angle such as the rotation angle sensor 12, for example.

The torque sensor 11 detects the torque acting on the shaft 5, as described above. The torque sensor 11 detects the torque acting on the shaft 5, in other words, the torque generated at the shaft 5 here. The torque sensor 11 detects the torque acting on a torsion bar (not illustrated), which is a torsion member configuring a part of the EPS device 8, for example. The torque (hereinafter sometimes referred to as a "steering torque") detected by the torque sensor 11 is typically a torque reflecting the driver steering torque that acts on the shaft 5 according to the steering force input to the steering 4 from the driver, a disturbance torque that is input to the shaft 5 via the tie rod end from the steering wheel 40 side according to a road surface disturbance input and the like to the steering wheel 40, and the like. The torque detected by the torque sensor 11 is detected with the counterclockwise side as a positive value and the clockwise side as a negative value, for example, but may be detected in a manner opposite thereto. The torque sensor 11 is electrically connected to the ECU 20, and outputs a detection signal corresponding to the detected steering torque to the ECU 20.

The ECU 20 controls each unit of the vehicle 2 on which the drive supporting device 1 is mounted. The ECU 20 is an electronic circuit that is configured as a well-known microcomputer including a CPU, a ROM, a RAM, and an interface. The ECU 20 is, for example, electrically connected to various sensors such as the torque sensor 11, the steering angle sensor 10, and the rotation angle sensor 12) described above, and the EPS device 8. The rotation angle detected by the rotation angle sensor 12 is used in a current control (output control) to the motor 8a by the ECU 20, for example. Here, the ECU 20 is also electrically connected to a vehicle speed sensor 13, a yaw rate sensor 14, and the like. The vehicle speed sensor 13 detects the vehicle speed, which is the travelling speed of the vehicle 2. The yaw rate sensor 14 detects the yaw rate of the vehicle 2. In addition, the ECU 20 may be electrically connected to various sensors such as a current sensor that detects various types of currents and a lateral G sensor that detects the lateral acceleration acting on the vehicle 2, a detector, and the like.

The ECU 20 receives an electric signal (detection signal) corresponding to the detection result from the various sensors, and outputs a drive signal to the EPS device 8 according to the input detection result to control the drive thereof. The ECU 20 is capable of executing the control of adjusting the torque generated by the EPS device 8 based on the detected steering operation physical amount.

The ECU 20, for example, controls the EPS device 8 based on the steering torque detected by the torque sensor 11, and the like, and adjusts and controls the assist torque generated by the EPS device 8 and caused to act on the shaft 5. The ECU 20 adjusts the output torque of the motor 8a by adjusting the motor supply current, which is the supply current to the motor 8a, and adjusts the assist torque. Here, the motor supply current is a current having a magnitude with which the EPS device 8 can generate a predetermined torque required. In this case, the ECU 20 may, for example, control the motor supply current to the motor 8a based on the rotation angle detected by the rotation angle sensor 12, and the like.

The steering device 30 configured as described above causes the steering torque input to the steering 4 from the driver, the torque generated by the EPS device 8 by the control of the ECU 20, and the like to act on the shaft 5. When the steering force and the steering auxiliary force act on the tie rod 7 from the shaft 5 via the gear mechanism 6, the steering device 30 then causes the tie rod 7 to be displaced in the left and right direction by an axial force of a magnitude corresponding to the driver steering torque by the steering and the torque generated by the EPS device 8, and the steering wheel 40 to be rolled. As a result, the steering device 30 can roll the steering wheel 40 by the steering force input to the steering 4 from the driver, and the steering auxiliary force generated by the EPS device 8, so that the steering operation by the driver can be aided and the burden of the driver can be alleviated in the steering operation.

The ECU 20 of the present embodiment then determines, in a distinguished manner, the active operation on the steering 4 and the passive operation on the steering 4 based on a parameter associated with the steering angle detected by the steering angle sensor 10 and a parameter associated with the steering torque detected by the torque sensor 11 as a predetermined index corresponding to the information of the steering system. Here, the ECU 20 determines the active operation and the passive operation based on the steering power corresponding to a product of the parameter associated with the steering angle detected by the steering angle sensor 10 and the parameter associated with the steering torque detected by the torque sensor 11. The ECU 20 can also determine the active operation and the passive operation, and then detect the strength thereof and apply the strength to the control.

The ECU 20 controls the steering device 30 configuring the supporting device 3 based on the determination result, and changes the content of the driving support by the supporting device 3. That is, the ECU 20 controls the steering device 30 based on the steering power corresponding to the product of the parameter associated with the steering angle detected by the steering angle sensor 10 and the parameter associated with the steering torque detected by the torque sensor 11, and changes the content of the driving support by the supporting device 3.

The ECU 20 may further, here, determine the active operation and the passive operation based on the steering work amount corresponding to a product of the parameter associated with the steering angle detected by the steering angle sensor 10 and the parameter associated with the steering torque detected by the torque sensor 11, in addition to the determination based on the steering power. That is, in addition to changing the content of the driving support based on the steering power, the ECU 20 may further change the content of the driving support by the supporting device 3 based on the steering work amount corresponding to the product of the parameter associated with the steering angle detected by the steering angle sensor 10 and the parameter associated with the steering torque detected by the torque sensor 11.

That is, the ECU 20 of the present embodiment typically determines the active operation and the passive operation based on the steering power, which is an index representing a transitional steering operation by the intention of the driver, and the steering work amount, which is an index representing a steady steering operation by the intention of the driver, and changes the content of the driving support by the supporting device 3 in accordance therewith.

The steering power and the steering work amount used in the determination and the control by the ECU 20 will now be described.

The steering power is an index representing the power in the steering operation of the driver on the steering 4, and is a physical amount representing an energy used per unit time. The steering work amount is an index representing the work in the steering operation of the driver on the steering 4, and is a physical amount representing the used energy. The relationship of a steering power P and a steering work amount W can be expressed with the following equation (1), where "t" indicates time.

$$P = dW/dt, \quad W = \int P(t)dt \qquad (1)$$

Here, the steering power P is, for example, calculated based on one of or both of a product of a steering speed (corresponds to a differential value of the steering angle) $\theta'$ corresponding to a steering angle $\theta$ detected by the steering angle sensor 10 and a steering torque T detected by the torque sensor 11, and a product of the steering angle $\theta$ detected by the steering angle sensor 10 and a torque differential value T' corresponding to the steering torque T detected by the torque sensor 11. Typically, the steering power P based on the product $[\theta' \cdot T]$ of the steering speed $\theta'$ and the steering torque T tends to reflect the intention of the course change, and the like in the transitional steering operation by the intention of the driver. On the other hand, typically, the steering power P based on the product $[\theta \cdot T']$ of the steering angle $\theta$ and the torque differential value T' tends to reflect the intention of the reverse input correspondence from the road surface, and the like in the transitional steering operation by the intention of the driver. The ECU 20, for example, detects the active operation on the steering 4 when the steering power P is greater than or equal to a power reference value (reference value) ThP set in advance, and detects the passive operation on the steering 4 when the steering power P is smaller than the power reference value ThP.

It is noted that the setting of the power reference value ThP will be described in detail later.

On the other hand, the steering work amount W is, for example, calculated based on the product of the steering angle $\theta$ detected by the steering angle sensor 10 and the steering torque T detected by the torque sensor 11. Typically, the steering work amount W based on the product $[\theta \cdot T]$ of the steering angle $\theta$ and the steering torque T tends to reflect the intention to continue turning, and the like in the steady steering operation by the intention of the driver. The ECU 20 detects the active operation on the steering 4 when the steering work amount W is greater than or equal to a work amount reference value (reference value) ThW set in advance, and detects the passive operation on the steering 4 when the steering work amount W is smaller than the work amount reference value ThW.

It is to be noted that the setting of the work amount reference value ThW will be described in detail later.

The extraction of the active operation and the passive operation using the steering power P will be more specifically described next.

The ECU 20 calculates the steering power P based on one of or both of the product $[\theta' \cdot T]$ of the steering speed $\theta'$ and the steering torque T, and the product $[\theta \cdot T']$ of the steering angle $\theta$ and the torque differential value T', determines the intention of the driver on the basis thereof, and reflects the same in the driving support by the supporting device 3 (steering device 30). The ECU 20 may carry out the determination of the intention of the driver using either one of the steering power P based on the product $[\theta' \cdot T]$ or the steering power P based on $[\theta \cdot T']$, or may individually calculate the same and carry out the determination of the intention of the driver using both steering powers. The ECU 20 may also calculate the steering power P in which the steering power based on the product $[\theta' \cdot T]$ and the steering power based on the product $[\theta \cdot T']$ are synthesized, and carry out the determination of the intention of the driver. The ECU 20 can calculate the steering power P using the following equation (2), for example.

$$P = A \cdot [\theta' \cdot T] + B \cdot [\theta \cdot T'] \quad (2)$$

In the above equation (2), "A" and "B" are coefficients, and are compatible values that can be appropriately set based on various conditions, actual vehicle evaluation, and the like. In the above equation (2), the ECU 20 can arbitrarily set the coefficients A and B to make an appropriate adjustment according to the application of the steering power P to be calculated, the properties of the vehicle 2, the properties of the driver, and the like, for example. For example, when it is desired to determine the active operation and the passive operation while reflecting the intention of course change by the intention of the driver and change the driving support, the ECU 20 can simplify the calculation equation of the steering power P by assuming that A=1 and B=0. Similarly, when it is desired to determine the active operation and the passive operation while reflecting the intention of the reverse input correspondence by the intention of the driver and change the driving support, the ECU 20 can simplify the calculation equation of the steering power P by assuming that A=0 and B=1. Furthermore, the ECU 20 can calculate the steering power P in which the product $[\theta' \cdot T]$ and the product $[\theta \cdot T']$ are synthesized at a desired ratio by arbitrarily adjusting the coefficients A and B. The ECU 20 thus can change the allocation of the reflecting extent of the respective intention in the steering power P, and hence the active operation and the passive operation can be appropriately determined according to the situation and the driving support can be changed.

It is to be noted that the ECU 20 may further calculate the steering power P by applying the law of Stephens with respect to the above equation (2). In this case, for example, the ECU 20 may apply $[k1 \cdot \theta'^{a1} \cdot k2 \cdot T^{a2}]$ instead of $[\theta' \cdot T]$ of the above equation (2). Similarly, for example, the ECU 20 may apply $[k3 \cdot \theta^{a3} \cdot k4 \cdot T'^{a4}]$ instead of $[\theta \cdot T']$ of the above equation (2). "k1", "k2", "k3", "k4", "a1", "a2", "a3", and "a4" are coefficients, and are compatible values that can be appropriately set based on various conditions, actual vehicle evaluation, and the like. The ECU 20, for example, thus can convert the physical amount that is nonlinear with respect to the sense of the driver to become linear, whereby the steering power P can become a value that complies more with the sense of the driver, and the determination and the driving support that comply more with the sense of the driver can be carried out.

The significance represented by the steering power P calculated in the above manner will be described next with reference to FIG. 2 and FIG. 3. FIG. 2 is an example of a steering characteristic diagram describing the significance represented by the steering power P based on the product $[\theta' \cdot T]$, where the horizontal axis is the steering torque T and the vertical axis is the steering speed $\theta'$. FIG. 3 is an example of a steering characteristic diagram describing the significance represented by the steering power P based on the product $[\theta \cdot T']$, where the horizontal axis is the (steering) torque differential value T' and the vertical axis is the steering angle $\theta$.

In FIG. 2, an equal driver intention line L11 indicated with a plurality of dotted lines is a collection of operation points (combination of steering speed $\theta'$ and steering torque T) representing the equal driver intention. Since the steering power P can be used as an index representing the intention of the driver, the operation point representing the equal driver intention corresponds, in other words, to the combination of the steering speed $\theta'$ and the steering torque T in which the steering power P (i.e., product $[\theta' \cdot T]$) is equal. That is, each equal driver intention line L11 is a collection of combinations of the steering speed $\theta'$ and the steering torque T in which the steering power P becomes equal. If $[\theta' \cdot T] = P$ (constant), this can be deformed to $\theta' = P/T$, and thus each equal driver intention line L11 becomes a rectangular hyperbola. For example, an operation point A and an operation point B in FIG. 2 are both positioned on the same equal driver intention line L11. Thus, the combination of the steering speed $\theta'$ and the steering torque T at the operation point A and the combination of the steering speed $\theta'$ and the steering torque T at the operation point B can be assumed as combinations where the driver is performing the steering operation with equal steering intention.

Then, when, for example, the active operation is carried out on the steering 4 by the driver, the operation point defined by the combination of the steering speed $\theta'$ and the steering torque T tends to be positioned in the vicinity of a region T11 in the steering characteristic diagram illustrated in FIG. 2. On the other hand, when, for example, the passive operation is carried out on the steering 4 by the driver, the operation point defined by the combination of the steering speed $\theta'$ and the steering torque T tends to be positioned in the vicinity of regions T12, T13, and T14 in FIG. 2. More specifically, if the steering operation itself is not carried out by the driver as the passive operation, the operation point defined by the combination of the steering speed $\theta'$ and the steering torque T tends to be positioned in the vicinity of the region T12 in FIG. 2. If the steering-hold operation is carried out by the driver as the passive operation, the operation point defined by the combination of the steering speed $\theta'$ and the steering torque T tends to be positioned in the vicinity of the region T13 in FIG. 2. If the hands free operation is carried out by the driver (or if the axial force does not exist at the time of jack-up and the like) as the passive operation, the operation point defined by the combination of the steering speed $\theta'$ and the steering torque T tends to be positioned in the vicinity of the region T14 in FIG. 2.

The relationship of each operation point and each of the regions T11, T12, T13, and T14 as illustrated in FIG. 2 can specify the tendency in advance according to the actual vehicle evaluation, and the like. Therefore, the ECU 20 can determine the intention of the driver according to the region where the operation point defined by the combination of the detected steering speed $\theta'$ and steering torque T is positioned in the steering characteristic diagram illustrated in FIG. 2. That is, the ECU 20 can estimate and discriminate that the driver carried out the active operation when, for example, the operation point defined by the combination of the steering speed $\theta'$ and the steering torque T is in the region T11.

Then, the power reference value ThP used in the discrimination of the active operation and the passive operation described above is set in advance based on the steering power P of when the active operation is carried out and the steering power P of when the passive operation is carried out. Here, for example, a first power reference value ThP1 is set based on the steering characteristic diagram illustrated in FIG. 2. The first power reference value ThP1 is the power reference value ThP set with respect to the steering power P based on the product [$\theta'\cdot T$]. The first power reference value ThP1 can be set based on the equal driver intention line L11 positioned at the boundary of the region of the active operation and the region of the passive operation in the steering characteristic diagram illustrated in FIG. 2. That is, for example, the equal driver intention line L11 (or the operation point defined by the combination of the steering speed $\theta'$ and the steering torque T) positioned at the boundary of the region of the active operation and the region of the passive operation is specified based on the actual vehicle evaluation, and the like. The steering power P (product [$\theta'\cdot T$]) represented by the specified equal driver intention line L11 (or operation point) is then assumed as the first power reference value ThP1.

Similarly, in FIG. 3, an equal driver intention line L21 indicated with a plurality of dotted lines is a collection of operation points (combination of steering angle $\theta$ and torque differential value T') representing the equal driver intention. The operation point representing the equal driver intention, in other words, corresponds to the combination of the steering angle $\theta$ and the torque differential value T' where the steering power P (i.e., product [$\theta\cdot T'$]) is equal. That is, each equal driver intention line L21 is a collection of combinations of the steering angle $\theta$ and the torque differential value T' in which the steering power P becomes equal. If [$\theta\cdot T'$]=P (constant), this can be deformed to $\theta$=P/T', and thus each equal driver intention line L21 becomes a rectangular hyperbola.

Then, when, for example, the active operation is carried out on the steering 4 by the driver, the operation point defined by the combination of the steering angle $\theta$ and the torque differential value T' tends to be positioned in the vicinity of a region T21 in the steering characteristic diagram illustrated in FIG. 3. On the other hand, when, for example, the passive operation is carried out on the steering 4 by the driver, the operation point defined by the combination of the steering angle $\theta$ and the torque differential value T' tends to be positioned in the vicinity of regions T22, T23, and T24 in FIG. 3. More specifically, if the steering operation itself is not carried out by the driver as the passive operation, the operation point defined by the combination of the steering angle $\theta$ and the torque differential value T' tends to be positioned in the vicinity of the region T22 in FIG. 3. If the steering-hold operation is carried out with respect to the disturbance by the driver as the passive operation, the operation point defined by the combination of the steering angle $\theta$ and the torque differential value T' tends to be positioned in the vicinity of the region T23 in FIG. 3. If the steering-hold operation is carried out at the time of turning by the driver as the passive operation, the operation point defined by the combination of the steering angle $\theta$ and the torque differential value T' tends to be positioned in the vicinity of the region T24 in FIG. 3.

The relationship of each operation point and each of the regions T21, T22, T23, and T24 as illustrated in FIG. 3 can specify the tendency in advance according to the actual vehicle evaluation, and the like. Therefore, the ECU 20 can determine the intention of the driver according to the region where the operation point defined by the combination of the detected steering angle $\theta$ and torque differential value T' is positioned in the steering characteristic diagram illustrated in FIG. 3.

Then, here for example, a second power reference value ThP2 is set based on the steering characteristic diagram illustrated in FIG. 3. The second power reference value ThP2 is the power reference value ThP set with respect to the steering power P based on the product [$\theta\cdot T'$]. The second power reference value ThP2 can be set based on the equal driver intention line L21 positioned at the boundary of the region of the active operation and the region of the passive operation in the steering characteristic diagram illustrated in FIG. 3. That is, for example, the equal driver intention line L21 (or the operation point defined by the combination of the steering angle $\theta$ and the torque differential value T') positioned at the boundary of the region of the active operation and the region of the passive operation is specified based on the actual vehicle evaluation, and the like. The steering power P (product [$\theta\cdot T'$]) represented by the specified equal driver intention line L21 (or operation point) is then assumed as the second power reference value ThP2.

It is to be noted that the power reference value ThP may be set similar to the above even when the steering power P in which the product [θ'·T] and the product [θ·T'] are synthesized at a desired ratio is calculated using the above equation (2) and the like, and the active operation and the passive operation are determined.

The ECU 20, for example, then detects the active operation when the steering power P is greater than or equal to the power reference value ThP, and detects the passive operation when the steering power P is smaller than the power reference value ThP based on the power reference value ThP set as described above and the steering power P calculated using the equation (2), and the like. The ECU 20 then changes the content of the driving support by the supporting device 3 between the case of the active operation and the case of the passive operation. In other words, the ECU 20 changes the content of the driving support by the supporting device 3 (steering device 30) between the case in which the steering power P is greater than or equal to the power reference value ThP, and the case in which the steering power P is smaller than the power reference value ThP. For example, when individually calculating the steering power P based on the product [θ'·T] and the steering power P based on the product [θ·T'] to determine the intention of the driver and to change the content of the driving support, the ECU 20 may use respectively the first power reference value ThP1 and the second power reference value ThP2, described above, as the power reference value ThP.

The magnitude of the steering power P also represents the strength of the intention of the driver (the intention of the active operation, the intention of the passive operation). Therefore, the ECU 20 may reflect the magnitude of the calculated steering power P in the content of the driving support. That is, the ECU 20 may change the control amount (assist torque, motor supply current, etc.) of the EPS device 8 (steering actuator) of the steering device 30 configuring the supporting device 3 based on the steering power P. Thus, the ECU 20 can reflect the strength of the intention of the driver detected through the steering power P in the driving support, and can compensate the strength of the intention of the driver to carry out the driving support corresponding to the strength of the intention of the driver.

The extraction of the active operation and the passive operation using the steering work amount W will be more specifically described next.

In this case, the ECU 20 calculates the steering work amount W based on the product [θ·T] of the steering angle θ and the steering torque T, determines the intention of the driver on the basis thereof, and reflects the same on the driving support by the supporting device 3 (steering device 30). The ECU 20 can calculate the steering work amount W using the following equation (3), for example.

$$W = \theta \cdot T \qquad (3)$$

It is to be noted that the ECU 20 may further calculate the steering work amount W by applying the law of Stephens with respect to the above equation (3). In this case, the ECU 20 may apply [k5·θ^{α5}·k6·T^{α6}] instead of [θ·T] of the above equation (3). "k5", "k6", "a5", and "a6" are coefficients, and are compatible values that can be appropriately set based on various conditions, actual vehicle evaluation, and the like. The ECU 20, for example, thus can convert the physical amount that is nonlinear with respect to the sense of the driver to become linear, whereby the steering work amount W can become a value that complies more with the sense of the driver, and the determination and the driving support that comply more with the sense of the driver can be carried out.

The significance represented by the steering work amount W calculated in the above manner will be described next with reference to FIG. 4. FIG. 4 is an example of a steering characteristic diagram describing the significance represented by the steering work amount W based on the product [θ·T], where the horizontal axis is the steering torque T and the vertical axis is the steering angle θ.

In FIG. 4, an equal driver intention line L31 indicated with a plurality of dotted lines is a collection of operation points (combination of steering angle θ and steering torque T) representing the equal driver intention. Since the steering work amount W can be used as an index representing the intention of the driver here, the operation point representing the equal driver intention corresponds, in other words, to the combination of the steering angle θ and the steering torque T in which the steering work amount W (i.e., product [θ·T]) is equal. That is, each equal driver intention line L31 is a collection of combinations of the steering angle θ and the steering torque T in which the steering work amount W becomes equal. If [θ·T]=W (constant), this can be deformed to θ=W/T, and thus each equal driver intention line L31 becomes a rectangular hyperbola.

Then, when, for example, the active operation is carried out on the steering 4 by the driver, the operation point defined by the combination of the steering angle θ and the steering torque T tends to be positioned in the vicinity of a region T31 in the steering characteristic diagram illustrated in FIG. 4. On the other hand, when, for example, the passive operation is carried out on the steering 4 by the driver, the operation point defined by the combination of the steering angle θ and the steering torque T tends to be positioned in the vicinity of regions T32, T33, and T34 in FIG. 4. More specifically, if the steering operation itself is not carried out by the driver as the passive operation, the operation point defined by the combination of the steering angle θ and the steering torque T tends to be positioned in the vicinity of the region T32 in FIG. 4. If the steering-hold operation (e.g., in the case of vehicle deflection, the steering angle is 0°, and thus the intention of steering is not necessarily present) is carried out by the driver as the passive operation, the operation point defined by the combination of the steering angle θ and the steering torque T tends to be positioned in the vicinity of the region T33 in FIG. 4. If the axial force does not exist at the time of steering angle offset, at the time of jack-up, and the like as the passive operation, the operation point defined by the combination of the steering angle θ and the steering torque T tends to be positioned in the vicinity of the region T34 in FIG. 4.

The relationship of each operation point and each of the regions T31, T32, T33, and T34 as illustrated in FIG. 4 can specify the tendency in advance according to the actual vehicle evaluation, and the like. Therefore, the ECU 20 can determine the intention of the driver according to the region where the operation point defined by the combination of the detected steering angle θ and steering torque T is positioned in the steering characteristic diagram illustrated in FIG. 4.

Then, the work amount reference value ThW used in the discrimination of the active operation and the passive operation described above is set in advance based on the steering work amount W of when the active operation is carried out and the steering work amount W of when the passive operation is carried out. Here, for example, the work amount reference value ThW is set based on the steering characteristic diagram illustrated in FIG. 4. The work amount reference value ThW can be set based on the equal driver intention line L31 positioned at the boundary of the region of the active operation and the region of the passive operation in the steering characteristic diagram illustrated in FIG. 4. That is, for example, the equal driver intention line L31 (or the operation point defined by the combination of the steering angle θ and the steering torque T) positioned at the boundary of the region of the active operation and the region of the passive operation is specified based on the actual vehicle evaluation, and the like. The steering work amount W (product [θ·T]) represented by the specified equal driver intention line L31 (or operation point) is then assumed as the work amount reference value ThW.

The ECU 20, for example, then detects the active operation when the steering work amount W is greater than or equal to the work amount reference value ThW, and detects the passive operation when the steering work amount W is smaller than the work amount reference value ThW based on the work amount reference value ThW set as described above and the steering work amount W calculated using the equation (3), and the like. The ECU 20 then changes the content of the driving support by the supporting device 3 between the case of the active operation and the case of the passive operation. That is, the ECU 20 changes the content of the driving support by the supporting device 3 (steering device 30) between the case in which the steering work amount W is greater than or equal to the work amount reference value ThW, and the case in which the steering work amount W is smaller than the work amount reference value ThW.

The magnitude of the steering work amount W also represents the strength of the intention of the driver (the intention of the active operation, the intention of the passive operation). Therefore, the ECU 20 may reflect the magnitude of the calculated steering work amount W in the content of the driving support. That is, the ECU 20 may change the control amount (assist torque, motor supply current, etc.) of the EPS device 8 (steering actuator) of the steering device 30 configuring the supporting device 3 based on the steering work amount W. Thus, the ECU 20 can reflect the strength of the intention of the driver detected through the steering work amount W in the driving support, and can compensate the strength of the intention of the driver to carry out the driving support corresponding to the strength of the intention of the driver.

The content of the driving support by the supporting device 3 will be described next.

As described above, the ECU 20 discriminates the active operation and the passive operation of the driver based on the steering power P and the power reference value ThP, as well as the steering work amount W and the work amount reference value ThW, and changes the content of the driving support by the supporting device 3 between the case of the active operation and the case of the passive operation. The ECU 20 provides the driving support corresponding to the active operation on the steering 4 when the steering power P is greater than or equal to the power reference value ThP, and provides the driving support corresponding to the passive operation on the steering 4 when the steering power P is smaller than the power reference value ThP. Similarly, the ECU 20 provides the driving support corresponding to the active operation on the steering 4 when the steering work amount W is greater than or equal to the work amount reference value ThW, and provides the driving support corresponding to the passive operation on the steering 4 when the steering work amount W is smaller than the work amount reference value ThW.

The ECU 20 of the present embodiment is configured such that the supporting device 3 includes the EPS device 8 (steering actuator) of the steering device 30, and thus the content of the driving support of the steering system carried out by the EPS device 8 can be changed between the case of the active operation and the case of the passive operation.

It is to be noted that here the driving support of the steering system carried out by the EPS device 8 includes, for example, an assist control, a dumping control, a hysteresis applying control, a wheel returning control, and the like. Such controls are carried out by adjusting the torque generated by the EPS device 8. As described above, the assist control is a control in which an assist force that aids the steering operation on the steering 4 by the driver is generated by the EPS device 8. The dumping control is a control in which a dumping force that simulates the attenuation corresponding to the viscosity property of the steering device 30 is generated by the EPS device 8. In the steering device 30, the dumping force that acts in the direction of suppressing the steering speed of the steering 4 is imparted by the dumping control so that the steering speed of the steering 4 tends to be suppressed, and ensuring of astringency and the feedback at the time of steering can be imparted. The hysteresis applying control is a control in which a frictional force (frictional torque) that simulates the elastic friction corresponding to the friction property of the steering device 30 is imparted by the EPS device 8 to impart and compensate the friction of the steering system in a controlled manner. In the steering device 30, the steering 4 tends to less likely to be returned as the frictional force is imparted by the hysteresis applying control. The wheel returning control is a control in which a wheel returning force (wheel returning torque) in the direction of the neutral position of the steering 4 is imparted by the EPS device 8 to smoothly return the steering 4 to the neutral position side, and moreover, a control of aiding a turn-back operation toward the neutral position side of the steering 4.

By way of example, when the steering power P is greater than or equal to the power reference value ThP, the ECU 20 reduces the degree of the driving support of suppressing the steering operation on the steering 4 compared to when the steering power P is smaller than the power reference value ThP to change the content of the driving support. That is, the ECU 20 typically reduces the degree of the driving support of suppressing the steering operation on the steering 4 in the case of the active operation compared to the case of the passive operation. The driving support of suppressing the steering operation on the steering 4 includes, for example, the dumping control, the hysteresis applying control, the wheel returning control, and the like. Here, by way of example, the ECU 20 reduces the dumping force generated by the EPS device 8 in the dumping control when the steering power P is greater than or equal to the power reference value ThP compared to when the steering power P is smaller than the power reference value ThP, that is, in the case of the active operation compared to the case of the passive operation.

It is to be noted that in addition to changing the content of the driving support as described above, the ECU 20 may further carry out the driving support of aiding the steering operation on the steering 4 positively not only at the time of the active operation but also at the time of the passive operation. The driving support of aiding the steering operation on the steering 4 includes, for example, the assist control, and the like. It is to be noted that if the supporting device 3 includes a variable gear ratio steering mechanism (VGRS device) capable of changing the gear ratio of the steering 4, a rear wheel steering device (ARS (Active Rear Steering) device) capable of steering the rear wheel of the vehicle 2, and the like as the steering actuator, the driving support of aiding the steering operation on the steering 4 may also include a control in the variable gear ratio steering mechanism, the rear wheel steering device, and the like.

The driving support reflecting the determination of the active operation and the passive operation will be described below with reference to FIG. 5 and FIG. 6 using a case of performing the assist control and the dumping control as the driving support of the steering system by way of example.

FIG. 5 is a block diagram illustrating one example of a schematic configuration of the ECU 20. The ECU 20, for example, is configured to function-conceptually include an assist control unit 21, a dumping control unit 22, an adder 23, a differential computing unit 24, an index computing unit 25, an active operation determining unit 26, a driving support changing unit 27, and the like.

The assist control unit 21 calculates a basic assist control amount in the assist control. The assist control unit 21 receives a detection signal corresponding to the steering torque T from the torque sensor 11, and receives a detection signal corresponding to a vehicle speed V from the vehicle speed sensor 13. The assist control unit 21 computes a target assist torque corresponding to the assist force that becomes the basis as the basic assist control amount through various methods based on the input detection signals. The assist control unit 21 outputs a current command value signal corresponding to the computed basic assist control amount to the adder 23.

The dumping control unit 22 calculates a dumping control amount in the dumping control. The dumping control unit 22 receives a detection signal corresponding to the steering speed θ' based on the steering angle from the steering angle sensor 10 and receives a detection signal corresponding to the vehicle speed V from the vehicle speed sensor 13. The dumping control unit 22 computes the torque corresponding to a target dumping force as the dumping control amount through various methods based on the input detection signals. The dumping control unit 22 outputs a current command value signal corresponding to the computed dumping control amount to the adder 23.

The adder 23 receives the current command value signal corresponding to the basic assist control amount from the assist control unit 21, and receives the current command value signal corresponding to the dumping control amount from the dumping control unit 22. The adder 23 computes a target steering control amount (final target torque) in which the basic assist control amount and the dumping control amount are added, based on the input current command value signals. The adder 23 outputs the current command value signal corresponding to the computed target steering control amount to the EPS device 8 as an EPS assist command, and controls the motor 8a of the EPS device 8. The ECU 20 thereby realizes the assist control and the dumping control as described above. This becomes the basic control.

The differential computing unit 24 computes the torque differential value T' of the steering torque T. The differential computing unit 24 receives a detection signal corresponding to the steering torque T from the torque sensor 11. The differential computing unit 24 computes the torque differential value T' of the steering torque T based on the input detection signal, and outputs a computation signal corresponding to the torque differential value T' to the index computing unit 25.

The index computing unit 25 computes an index for the determination of the active operation and the passive operation. The index computing unit 25 of the present embodiment is configured to include a first power computation portion 25a that computes the steering power P1 based on the product [θ'·T], a second power computation portion 25b that computes a steering power P2 based on the product [θ·T'], and a work amount computation portion 25c that computes the steering work amount W based on the product [θ·T] as the index. It is to be noted that the index computing unit 25 is not limited thereto, and may be configured to include any of the first power computation portion 25a, the second power computation portion 25b, and the work amount computation portion 25c, or may be configured to include a computation portion that computes the steering power P in which the product [θ'·T] and the product [θ·T'] are synthesized.

The first power computation portion 25a receives a detection signal corresponding to the steering speed θ' based on the steering angle from the steering angle sensor 10, and receives a detection signal corresponding to the steering torque T from the torque sensor 11. The first power computation portion 25a computes the steering power P1 by computing a product of a steering speed θ'(t) in the current control period and a steering torque T(t) in the current control period based on the input detection signals. The first power computation portion 25a outputs a computation signal corresponding to the computed steering power P1 to the active operation determining unit 26.

The second power computation portion 25b receives a detection signal corresponding to the steering angle θ from the steering angle sensor 10, and receives a computation signal corresponding to the torque differential value T' from the differential computing unit 24. The second power computation portion 25b computes the steering power P2 by computing a product of a steering angle θ(t) in the current control period and a torque differential value T'(t) in the current control period based on the input detection signals and the computation signals. The second power computation portion 25b outputs a computation signal corresponding to the computed steering power P2 to the active operation determining unit 26.

The work amount computation portion 25c receives a detection signal corresponding to the steering angle θ from the steering angle sensor 10 and a detection signal corresponding to the steering torque T from the torque sensor 11. The work amount computation portion 25c computes the steering work amount W by computing a product of the steering angle θ(t) and the steering torque T(t) in the current control period based on the input detection signals. The work amount computation portion 25c outputs a computation signal corresponding to the computed steering work amount W to the active operation determining unit 26.

The active operation determining unit 26 discriminates the active operation of the driver. The active operation determining unit 26 receives the computation signal corresponding to the steering power P1 from the first power computation portion 25a, receives the computation signal corresponding to the steering power P2 from the second power computation portion 25b, and receives the computation signal corresponding to the steering work amount W from the work amount computation portion 25c. The active operation determining unit 26 determines whether or not the active operation is carried out by the driver based on the input computation signals, and the first power reference value ThP1, the second power reference value ThP2, and the work amount reference value ThW set in advance as described above.

Here, the active operation determining unit 26 determines that the active operation is carried out by the driver when determining that a period satisfying one or more of the following conditions 1 to 3 has continued for a predetermined period A set in advance. On the other hand, the active operation determining unit 26 determines that the passive operation is carried out by the driver when determining that the period satisfying one or more of the following conditions 1 to 3 is shorter than the predetermined period A or when determining that none of the following conditions 1 to 3 is satisfied. Then, the active operation determining unit 26 outputs a determination signal corresponding to the determination result to the driving support changing unit 27. It is to be noted that the predetermined period A, for example, may be set in advance as a period capable of reliably discriminating the active operation and the passive operation.

(Condition 1) The steering power P1 is greater than or equal to the first power reference value ThP1 (P1≥ThP1).
(Condition 2) The steering power P2 is greater than or equal to the second power reference value ThP2 (P2≥ThP2).
(Condition 3) The steering work amount W is greater than or equal to the work amount reference value ThW (W≥ThW).

It is to be noted that the active operation determining unit 26 has been described here as determining that the active operation is carried out by the driver when determining that the period satisfying one or more of the above conditions 1 to 3 has continued for the predetermined period A set in advance, but is not limited thereto. The active operation determining unit 26 may determine that the active operation is carried out by the driver when determining that the period satisfying all of the above conditions 1 to 3 has continued for the predetermined period A.

The driving support changing unit 27 changes the content of the driving support by the supporting device 3 according to the determination result of the active operation and the passive operation. The driving support changing unit 27 receives a determination signal corresponding to the determination result on the active operation from the active operation determining unit 26. The driving support changing unit 27 changes the content of the driving support by the supporting device 3 based on the input determination signal. The driving support changing unit 27 changes the content of the driving support of the steering system carried out by the EPS device 8 between the case in which the active operation determining unit 26 determines that the active operation is carried out by the driver and the case in which the active operation determining unit 26 determines that the passive operation is carried out by the driver.

Here, the case in which the active operation determining unit 26 determines that the active operation is carried out by the driver is typically the case of determining that the period satisfying one or more of the above conditions 1 to 3 has continued for the predetermined period A set in advance. On the other hand, the case in which the active operation determining unit 26 determines that the passive operation is carried out by the driver is typically the case of determining that the period satisfying one or more of the above conditions 1 to 3 is shorter than the predetermined period A, or the case of determining that none of the above conditions 1 to 3 is satisfied. That is, the driving support changing unit 27 changes the content of the driving support by the supporting device 3, for example, between the case in which the steering power P1 is greater than or equal to the first power reference value ThP1 and the case in which the steering power P1 is smaller than the first power reference value ThP1. The driving support changing unit 27 also changes the content of the driving support by the supporting device 3, for example, between the case in which the steering power P2 is greater than or equal to the second power reference value ThP2 and the case in which the steering power P2 is smaller than the second power reference value ThP2. The driving support changing unit 27 also changes the content of the driving support by the supporting device 3, for example, between the case in which the steering work amount W is greater than or equal to the work amount reference value ThW and the case in which the steering work amount W is smaller than the work amount reference value ThW.

Here, when it is determined that the active operation is carried out, the driving support changing unit 27 outputs a control signal for relatively reducing the dumping force generated by the EPS device 8 to the dumping control unit 22 in the dumping control, which is the driving support of suppressing the steering operation on the steering 4, compared to when it is determined that the passive operation is carried out. The driving support changing unit 27 thus changes the content of the driving support by the dumping control, and changes to the driving support of relatively reducing the degree of driving support of suppressing the steering operation on the steering 4. In this case, when it is determined that the active operation is carried out, the dumping control unit 22 relatively reduces the dumping control amount to be computed, that is, the target dumping force compared to when it is determined that the passive operation is carried out. As a result, when the active operation is carried out on the steering 4 by the driver, the drive supporting device 1 can prevent the relevant operation from being limited by the driving support and can prevent the comfortable steering operation from being inhibited.

When it is determined that the passive operation is carried out, the driving support changing unit 27 outputs a control signal for relatively increasing the dumping force generated by the EPS device 8 to the dumping control unit 22 in the dumping control compared to when it is determined that the active operation is carried out. The driving support changing unit 27 thus changes the content of the driving support by the dumping control, and changes to the driving support of relatively increasing the degree of driving support of suppressing the steering operation on the steering 4. In this case, when it is determined that the passive operation is carried out, the dumping control unit 22 relatively increases the dumping control amount to be computed, that is, the target dumping force compared to when it is determined that the active operation is carried out. As a result, when the passive operation is carried out on the steering 4 by the driver, the drive supporting device 1 can appropriately cause the dumping force to act by the driving support, and can facilitate the operation by the driver.

That is, the driving support changing unit 27 limits the dumping control, which is the driving support of suppressing the steering operation on the steering 4 when the active operation is carried out, and changes the content of the driving support to allow the dumping control when the passive operation is carried out. As a result, the drive supporting device 1 can realize the driving support reflecting the intention of the driver according to the respective cases such as when the active operation is carried out, and when the passive operation is carried out.

It is to be noted that in addition to the changing of the content of the driving support, the driving support changing unit 27 may further carry out the assist control, which is the driving support of positively aiding the steering operation on the steering 4 not only at the time of the active operation but also at the time of the passive operation. In this case, even when it is determined that the passive operation is carried out, the driving support changing unit 27 outputs the control signal to the assist control unit 21 so that the assist force becomes similar to the assist force generated by the EPS device 8 when it is determined that the active operation is carried out. The driving support changing unit 27 thus carries out the driving support by the assist control in the passive operation as well, similarly to in the active operation. In this case, when it is determined that the passive operation is carried out, the assist control unit 21 computes the basic assist control amount, that is, the assist force to become the basis so as to be equal to when it is determined that the active operation is carried out. As a result, the drive supporting device 1 can aid the operation of the driver by the driving support and can facilitate the operation by the driver even when the passive operation is carried out on the steering 4 by the driver, similarly to when the active operation is carried out.

One example of the control by the ECU 20 will be described next with reference to FIG. 6. Furthermore, the control routine is repeated at the control period of several milliseconds to several tens of milliseconds.

The ECU 20 first measures the steering torque T, the steering speed $\theta'$, and the steering angle $\theta$ based on the detection results of the steering angle sensor 10 and the torque sensor 11 (step ST1).

Next, the differential computing unit 24 of the ECU 20 computes the torque differential value T'=dT/dt based on the steering torque T measured in step ST1 (step ST2).

Next, the index computing unit 25 of the ECU 20 computes the steering power P1=$\theta'$(t)·T(t), the steering power P2=$\theta$(t)·T'(t), and the steering work amount W=$\theta$(t)·T(t) in the current control period based on the steering torque T, the steering speed $\theta'$, and the steering angle $\theta$ measured in step ST1, and the torque differential value T' computed in step ST2 (step ST3).

Next, the active operation determining unit 26 of the ECU 20 determines whether or not the active operation is carried out by the driver based on the steering power P1, the steering power P2, and the steering work amount W computed in step ST3 (step ST4). For example, the active operation determining unit 26 determines whether or not the active operation is carried out by the driver by determining whether or not the state of (P1≥ThP1) or (P2≥ThP2) or (W≥ThW) has continued for the predetermined period A or longer.

When it is determined that the active operation is carried out by the driver in step ST4 (step ST4: Yes), the driving support changing unit 27 of the ECU 20 changes the support content by the supporting device 3 so as to become the driving support corresponding to the active operation on the steering 4. In this case the driving support changing unit 27 changes the content of the driving support, for example, so as to limit the dumping control, which is the driving support of suppressing the steering operation on the steering 4, that is, so as to relatively reduce the dumping force. The assist control unit 21 and the dumping control unit 22 of the ECU 20 then control the EPS device 8 in accordance therewith, executes the driving support (step ST5), terminates the control period of this time and proceeds to the control period of next time.

When it is determined that the active operation is not carried out by the driver in step ST4, that is, when it is determined that the passive operation is carried out (step ST4: No), the driving support changing unit 27 of the ECU 20 changes the support content by the supporting device 3 so as to become the driving support corresponding to the passive operation on the steering 4. In this case, the driving support changing unit 27, for example, changes the content of the driving support so as to allow the dumping control, which is the driving support of suppressing the steering operation on the steering 4, that is, so as to relatively increase the dumping force. The assist control unit 21 and the dumping control unit 22 of the ECU 20 then control the EPS device 8 in accordance therewith, executes the driving support (step ST6), terminates the control period of this time and proceeds to the control period of next time.

The drive supporting device 1 configured as described above changes the content of the driving support by the supporting device 3 between the case in which a steering power corresponding to a product of a parameter associated with a steering angle and a parameter associated with a steering torque is greater than or equal to a reference value set in advance, and the case in which the steering power is smaller than the reference value. Thus, the drive supporting device 1 can change the content of the driving support by the supporting device 3 between, for example, the case in which the active operation is carried out by the driver and the case in which the passive operation is carried out by the driver. For example, the drive supporting device 1 provides the driving support corresponding to the active operation when the steering power is greater than or equal to the power reference value, and provides the driving support corresponding to the passive operation when the steering power is smaller than the power reference value. As a result, the drive supporting device 1 can realize the driving support reflecting the intention of the driver according to the respective cases such as when the active operation is carried out, and when the passive operation is carried out. That is, the drive supporting device 1 can determine the active operation and the passive operation in a distinguished manner based on the steering power and the like, and reflect the determined operational intention of the driver in the driving support to carry out the driving support in which the sense of discomfort is small for the driver.

The drive supporting device 1 of the present embodiment can carry out the steering support in which the sense of discomfort is small for the driver by reflecting the determined operational intention of the driver in the driving support of the steering system. Here, the drive supporting device 1 can change the content of the driving support so as to limit the dumping control when it can be determined that the active operation is carried out, and allow the dumping control when it can be determined that the passive operation is carried out. For example, when the active operation is carried out on the steering 4 by the driver, the drive supporting device 1 can prevent the relevant operation from being limited by the driving support and can prevent the comfortable steering operation by the driver from being inhibited. On the other hand, when the passive operation is carried out on the steering 4 by the driver, the drive supporting device 1 can appropriately cause the dumping force to act by the driving support, and can facilitate the operation by the driver.

The drive supporting device 1 can also extract the intention of the driver from both the steady steering operation and the transitional steering operation by the driver and reflect the same in the driving support by determining the intention of the driver using both the steering power and the steering work amount and changing the content of the driving support, and hence the driving support in which the sense of discomfort is further reduced can be carried out.

The drive supporting device 1 can also carry out the determination of the intention of the driver using both the steering power P based on the product [θ'·T] and the steering power P based on the product [θ·T'] as the steering power, and change the content of the driving support to reflect the intention of the course change of the driver, the intention of the reverse input correspondence of the driver, and the like, and can realize the control in which the sense of discomfort is small, for example. At the time of the active operation and the time of the passive operation, the drive supporting device 1 is also capable of executing the compensation control corresponding to the respective time.

Here, FIG. 7 is a block diagram illustrating another example of a schematic configuration of the ECU 20. For example, the ECU 20 can realize the functions corresponding to the assist control unit 21, the dumping control unit 22, the active operation determining unit 26, and the driving support changing unit 27 as described above even with the configuration illustrated in FIG. 7. Thus, the ECU 20 can compute the steering power P, in other words, the steering control amount reflecting the intention of the driver, and reflect the same in the driving support. It is to be noted that a case of computing the steering control amount according to the steering power P1 based on the product [θ'·T] will be described here by way of example, but a case of computing the steering control amount reflecting the steering power P2 based on the product [θ·T'], the steering power P in which the product [θ'·T] and the product [θ·T'] are synthesized, the steering work amount W based on the product [θ·T'], and the like, and reflecting the same in the driving support is also substantially similar. Furthermore, to facilitate the description, here an example of the case in which the vehicle speed is not taken into consideration in the assist control and the dumping control will be described first, and then an example of the case in which the vehicle speed is taken into consideration will be described with FIG. 8 and FIG. 9, to be described later.

In this case, the ECU 20 receives a detection signal corresponding to the steering speed θ' based on the steering angle from the steering angle sensor 10, and receives a detection signal corresponding to the steering torque T from the torque sensor 11. The ECU 20 then uses a multiplier 101, control maps MP1, MP2, MP3, and MP4, and adders 102, 103, and 104 to compute a target steering control amount (final target torque) reflecting the steering power P1 based on the product [θ'·T], in other words, a target steering control amount reflecting the intention of the driver from the input detection signals. The ECU 20 then outputs a current command value signal corresponding to the computed target steering control amount to the EPS device 8 as an EPS assist command, and controls the motor 8a of the EPS device 8.

In the example of FIG. 7, the target steering control amount is expressed with the following equation (4) by the operation of the adders 102, 103, and 104.

Target steering control amount=basic assist control amount+assist correction amount+dumping control amount+dumping correction amount (4)

The basic assist control amount of the above equation (4) is set by the control map MP1. The ECU 20 computes the basic assist control amount from the control map MP1 based on the steering torque T. The control map MP1 is a map in which the steering torque T and the basic assist control amount are corresponded to each other, and is stored in advance in a storage unit. In the control map MP1, the basic assist control amount becomes large with increase in the steering torque T.

The assist correction amount of the above equation (4) is set by the control map MP2. The ECU 20, for example, keeps the assist correction amount, which is the correction amount of the assist force generated by the EPS device 8, constant when an absolute value of the steering power P is smaller than or equal to a predetermined power set in advance, and changes the assist correction amount with increase in the absolute value of the steering power P when the absolute value of the steering power P is greater than the predetermined power on the basis of the control map MP2. Here, the predetermined power may be set in advance, for example, according to the actual vehicle evaluation, and the like. The ECU 20 computes the product [θ'·T]=P1 of the steering speed θ' and the steering torque T via the multiplier 101, and computes the assist correction amount from the control map MP2 based on the computed product [θ'·T]. The control map MP2 is a map in which the product [θ'·T] and the assist correction amount are corresponded to each other, and is stored in advance in the storage unit. In the control map MP2, the assist correction amount is constant, zero here, within a predetermined range (a range corresponding to the predetermined power) in the vicinity of the first power reference value ThP1, and becomes large with increase in the absolute value of the product [θ'·T] (i.e., increase in the strength of intention) in both cases of the positive side (active operation side) and the negative side (passive operation side) with the first power reference value ThP1 as the reference outside the predetermined range. In the control map MP2, the assist correction amount is set such that the final control amount (assist force) in the assist control becomes large with increase in the absolute value of the product [θ'·T] in both the active operation and the passive operation.

The dumping control amount of the above equation (4) is set by the control map MP3. The ECU 20 computes the dumping control amount from the control map MP3 based on the steering speed θ'. The control map MP3 is a map in which the steering speed θ' and the dumping control amount are corresponded to each other, and is stored in advance in the storage unit. In the control map MP3, the absolute value of the dumping control amount becomes large with increase in the steering speed θ'. In the control map MP3, a region on the lower side than the origin represents the dumping force acting in a direction opposite to the assist force (assist torque) by the assist control.

The dumping correction amount of the above equation (4) is set by the control map MP4. The ECU 20, for example, keeps the dumping correction amount, which is the correction amount of the dumping force generated by the EPS device 8, constant when an absolute value of the steering power P is smaller than or equal to a predetermined power set in advance, and changes the dumping correction amount with increase in the absolute value of the steering power P when the absolute value of the steering power P is greater than the predetermined power on the basis of the control map MP4. Here, the predetermined power may be set in advance, for example, according to the actual vehicle evaluation and the like, similarly to the above. The ECU 20 computes the dumping correction amount from the control map MP4 based on the product [θ'·T] computed via the multiplier 101. The control map MP4 is a map in which the product [θ'·T] and the dumping correction amount are corresponded to each other, and is stored in advance in the storage unit. In the control map MP4, the dumping correction amount is constant, zero here, within a predetermined range (a range corresponding to the predetermined power) in the vicinity of the first power reference value ThP1, and is set such that the sign is interchanged between the positive side (active operation side) and the negative side (passive operation side) and becomes large with increase in the absolute value of the product [θ'·T] (i.e., increase in the strength of intention) with the first power reference value ThP1 as the reference outside the predetermined range. In the control map MP4, the dumping correction amount is set such that the final control amount (dumping force) in the dumping control becomes small with increase in the absolute value of the product [θ'·T] in the active operation and is set such that the final control amount (dumping force) in the dumping control becomes large with increase in the absolute value of the product [θ'·T] in the passive operation.

As a result, the ECU 20 can relatively reduce (dumping DOWN) the dumping force generated by the EPS device 8 in the dumping control when it can be determined that the active operation is carried out (i.e., P1≥ThP1), as described above. On the other hand, the ECU 20 can relatively increase (dumping UP the dumping force generated by the EPS device 8 in the dumping control when it can be determined that the passive operation is carried out (i.e., P1<ThP1). Therefore, the drive supporting device 1 can prevent the comfortable steering operation by the driver from being inhibited when the active operation is carried out, and also can facilitate the operation by the driver when the passive operation is carried out.

As described above, the ECU 20 can also relatively increase (assist UP) the assist force generated by the EPS device 8 in the assist control according to the strength of the intention in both the case in which it can be determined that the active operation is carried out (i.e., P1≥ThP1) and the case in which it can be determined that the passive operation is carried out (i.e., P1<ThP1). Therefore, even when the passive operation is carried out on the steering 4 by the driver, the drive supporting device 1 can aid the operation of the driver by the driving support and can facilitate the operation by the driver, similarly to when the active operation is carried out.

Other schematic configurations of the ECU 20 of when the vehicle speed is taken into consideration in the assist control and the dumping control will be described next with reference to the block diagrams of FIG. 8 and FIG. 9. For example, even with the configuration illustrated in FIG. 8 and FIG. 9, the ECU 20 can realize the functions corresponding to the assist control unit 21, the dumping control unit 22, the active operation determining unit 26, and the driving support changing unit 27 described above. It is to be noted that a case of computing the steering control amount according to the steering power P1 based on the product [θ'·T] will be described here again by way of example. Furthermore, the case of the active operation illustrated in FIG. 8 and the case of the passive operation illustrated in FIG. 9 will be separately described here to facilitate the description. In FIG. 8 and FIG. 9, the configurations common to FIG. 7 are denoted by the common reference numerals, and also the description thereof will be omitted as much as possible.

In this case, the ECU 20 receives a detection signal corresponding to the steering speed θ' based on the steering angle from the steering angle sensor 10, receives a detection signal corresponding to the steering torque T from the torque sensor 11, and receives a detection signal corresponding to the vehicle speed V from the vehicle speed sensor 13. Then, when it can be determined that the active operation is carried out, that is, when the steering power P1 based on the product [θ'·T] is greater than or equal to the first power reference value ThP1, the ECU 20 computes the target steering control amount reflecting the steering power P1 based on the product [θ'·T] in the above manner. That is, the ECU 20 uses multipliers 101, 105, 106, 107, 110, and 111, control maps MP1, MP2-1, MP3, MP4-1, MP5-1, MP6, and MP7-1, and adders 104, 108, and 109 to compute the target steering control amount from the input detection signals. The ECU 20 thus can change the control amount of the EPS device 8 based on the steering power P1 and the vehicle speed of the vehicle 2.

In the steering system such as the steering device 30 (supporting device 3) mounted on the vehicle 2, the steering torque tends to become relatively large when the steering is carried out at a relatively fast steering speed by the driver, for example, and as a result there is a risk that the steering may become difficult to carry out due to the steering system inertia, the influence of the vehicle 2, and the like. On the other hand, at the time of emergency such as avoiding an obstacle, there is also a demand to quickly avoid the obstacle at a relatively fast steering speed.

Here, by way of example, the ECU 20 computes the target steering control amount so that the assist force by the EPS device 8 becomes relatively large as the intention of the active operation by the driver becomes relatively strong, that is, the steering power P1 based on the product [θ'·T] is greater than or equal to the first power reference value ThP1 and the absolute value of the steering power P1 becomes relatively large. The drive supporting device 1 thus can compute the steering control amount reflecting the intention of the driver and reflect the same in the driving support, and can carry out the driving support so that the vehicle 2 can easily move following the intention of the driver.

In the example of FIG. 8, the target steering control amount is expressed with the following equation (5) by the operations of the multipliers 105, 106, 107, 110, and 111, and the adders 104, 108, and 109.

Target steering control amount=[basic assist control amount×(assist correction amount×first gain+1)]+[dumping control amount×second gain×(dumping correction amount×third gain+1)]   (5)

The basic assist control amount of the above equation (5) is set by the control map MP1.

The assist correction amount of the above equation (5) is set by the control map MP2-1. The ECU 20 computes the assist correction amount from the control map MP2-1 based on the product [θ'·T] computed via the multiplier 101. The control map MP2-1 is a map in which the product [θ'·T] and the assist correction amount are corresponded to each other, and is stored in advance in the storage unit. In the control map MP2-1, the assist correction amount becomes large with increase in the absolute value of the product [θ'·T] (i.e., increase in the strength of the intention) in the positive side (active operation side). That is, in the control map MP2-1, the assist correction amount is set such that the final control amount (assist force) in the assist control becomes large with increase in the absolute value of the product [θ'·T], that is, with increase in the strength of the active operational intention in the active operation. In the control map MP2-1, however, the assist correction amount becomes zero when the absolute value of the product [θ'·T] is smaller than a predetermined value set in advance.

The first gain of the above equation (5) is set by the control map MP5-1. The ECU 20 computes the first gain from the control map MP5-1 based on the vehicle speed V. The control map MP5-1 is a map in which the vehicle speed V and the first gain are corresponded to each other, and is stored in advance in the storage unit. In the control map MP5-1, the first gain becomes large with increase in the vehicle speed V. That is, for example, the scene where the emergency operation as described above is required is a scene where the vehicle speed is increased to a certain extent, and hence in the control map MP5-1 the first gain is set so that the final control amount (assist force) in the assist control becomes large with increase in the vehicle speed. It is to be noted that in the control map MP5-1, the first gain becomes zero when the vehicle speed V is lower than a first predetermined vehicle speed (a first predetermined vehicle speed in the control map MP5-1) set in advance, and becomes constant when the vehicle speed V is higher than a second predetermined vehicle speed (a second predetermined vehicle speed in the control map MP5-1) set in advance.

The dumping control amount of the above equation (5) is set by the control map MP3.

The second gain of the above equation (5) is set by the control map MP6. The ECU 20 computes the second gain from the control map MP6 based on the vehicle speed V. The control map MP6 is a map in which the vehicle speed V and the second gain are corresponded to each other, and is stored in advance in the storage unit. In the control map MP6, the second gain once becomes small with increase in the vehicle speed V, and after becoming constant, gradually increases from the predetermined vehicle speed set in advance.

The dumping correction amount of the above equation (5) is set by the control map MP4-1. The ECU 20 computes the dumping correction amount from the control map MP4-1 based on the product [θ'·T] computed via the multiplier 101. The control map MP4-1 is a map in which the product [θ'·T] and the dumping correction amount are corresponded to each other, and is stored in advance in the storage unit. In the control map MP4-1, the dumping correction amount is set so that the final control amount (dumping force) in the dumping control becomes small to increase the final assist amount by the EPS device 8 with increase in the absolute value of the product [θ'·T], that is, increase in the strength of the active operational intention in the active operation (positive side). It is to be noted that in the control map MP4-1, the dumping correction amount becomes zero when the absolute value of the product [θ'·T] is lower than a first predetermined value (a first predetermined value in the control map MP4-1) set in advance, and becomes constant when the absolute value of the product [θ'·T] is higher than a second predetermined value (a first predetermined value in the control map MP4-1) set in advance.

The third gain of the above equation (5) is set by the control map MP7-1. The ECU 20 computes the third gain from the control map MP7-1 based on the vehicle speed V. The control map MP7-1 is a map in which the vehicle speed V and the third gain are corresponded to each other, and is stored in advance in the storage unit. In the control map MP7-1, the third gain becomes large with increase in the vehicle speed V. It is to be noted that in the control map MP7-1, the third gain becomes zero when the vehicle speed V is lower than a first predetermined vehicle speed (a first predetermined vehicle speed in the control map MP7-1) set in advance and becomes constant when the vehicle speed V is higher than a second predetermined vehicle speed (a second predetermined vehicle speed in the control map MP7-1) set in advance.

As a result, the ECU 20 can carry out the driving support so that the vehicle 2 can easily move following the intention of the driver, for example when it is desired to, at the time of emergency such as avoiding an obstacle, quickly avoid the obstacle at a relatively fast steering speed as described above. That is, the ECU 20 can set the target steering control amount so that the assist force by the EPS device 8 becomes relatively large as the intention of the active operation by the driver becomes relatively strong, in other words, the steering power P1 based on the product [θ'·T] is greater than or equal to the first power reference value ThP1 and the steering power P1 becomes relatively large. Therefore, the drive supporting device 1 can compute the steering control amount reflecting the intention of the driver and reflect the same in the driving support, and can carry out the driving support so that the vehicle 2 can easily move following the intention of the driver.

The ECU 20 also computes the target steering control amount (final target torque) reflecting the steering power P1 based on the product [θ'·T] in the following manner when it can be determined that the passive operation is carried out, that is, when the steering power P1 based on the product [θ'·T] is smaller than the first power reference value ThP1. That is, the ECU 20 uses the multipliers 101, 105, 106, 107, 110, and 111, control maps MP1, MP2-2, MP3, MP4-2, MP5-2, MP6, and MP7-2, and the adder 104 as illustrated in FIG. 9 to compute the target steering control amount from the input detection signals. The ECU 20 thus can change the control amount of the EPS device 8 based on the steering power P1 and the vehicle speed of the vehicle 2.

In the steering system such as the steering device 30 (supporting device 3) mounted on the vehicle 2, for example, the burden of the driver tends to become relatively large in a situation where the steering 4 rapidly returns against the intention of the driver and power is used for its adjustment. The increase in the burden of the driver tends to become significant when the vehicle speed of the vehicle 2 is relatively high or when the number of passengers on the vehicle 2 is relatively large, for example.

Here by way of example, the ECU 20 computes the target steering control amount so that the assist force by the EPS device 8 becomes relatively large as the intention of the passive operation by the driver becomes relatively strong, that is, the steering power P1 based on the product [θ'·T] is smaller than the first power reference value ThP1 and the absolute value of the steering power P1 becomes relatively large. Thus, the drive supporting device 1 can compute the steering control amount reflecting the intention of the driver and reflect the same in the driving support, and can carry out the driving support so that the steering speed does not become too large and the burden of the driver is alleviated in the above cases.

In the example of FIG. 9, the target steering control amount is expressed with the following equation (6) by the operations of the multipliers 105, 106, 107, 110, and 111, and the adder 104.

$$\text{Target steering control amount} = [\text{basic assist control amount} \times \text{assist correction amount} \times \text{fourth gain}] + [\text{dumping control amount} \times \text{second gain} \times \text{dumping correction amount} \times \text{fifth gain}] \quad (6)$$

The basic assist control amount of the above equation (6) is set by the control map MP1.

The assist correction amount of the above equation (6) is set by the control map MP2-2. The ECU 20 computes the assist correction amount from the control map MP2-2 based on the product [θ'·T] computed via the multiplier 101. The control map MP2-2 is a map in which the product [θ'·T] and the assist correction amount are corresponded to each other, and is stored in advance in the storage unit. In the control map MP2-2, the assist correction amount becomes large with increase in the absolute value of the product [θ'·T] (i.e., increase in the strength of the intention) in the negative side (passive operation side). That is, in the control map MP2-2, the assist correction amount is set such that the final control amount (assist force) in the assist control becomes large with increase in the absolute value of the product [θ'·T], that is, with increase in the strength of the passive operational intention in the passive operation. In the control map MP2-2, however, the assist correction amount becomes zero when the absolute value of the product [θ'·T] is smaller than a predetermined value.

The fourth gain of the above equation (6) is set by the control map MP5-2. The ECU 20 computes the fourth gain from the control map MP5-2 based on the vehicle speed V. The control map MP5-2 is a map in which the vehicle speed V and the fourth gain are corresponded to each other, and is stored in advance in the storage unit. In the control map MP5-2, the fourth gain becomes large with increase in the vehicle speed V. In the control map MP5-2, the fourth gain does not become zero but becomes constant at a relatively small value even when the vehicle speed V is lower than a first predetermined vehicle speed (a first predetermined vehicle speed in the control map MP5-2) set in advance, and becomes constant at a relatively high value when the vehicle speed V is higher than a second predetermined vehicle speed (a second predetermined vehicle speed in the control map MP5-2) set in advance. For example, a scene where the adjustment in the returning of the steering 4 becomes a burden as described above is when the vehicle speed is increased to a certain extent, but the steering 4 is sometimes returned at a relatively fast speed by the torsion of the tire and the like even in the stopped state of the vehicle 2, and there is a risk that the burden may become large. Thus, in the control map MP5-2, the fourth gain is set so that the final control amount (assist force) in the assist control becomes large with increase in the vehicle speed, and is set so that the assist force of a predetermined magnitude is output even when the vehicle speed V is around zero.

The dumping control amount of the above equation (6) is set by the control map MP3.

The second gain of the above equation (6) is set by the control map MP6.

The dumping correction amount of the above equation (6) is set by the control map MP4-2. The ECU 20 computes the dumping correction amount from the control map MP4-2 based on the product [θ'·T] computed via the multiplier 101. The control map MP4-2 is a map in which the product [θ'·T] and the dumping correction amount are corresponded to each other, and is stored in advance in the storage unit. In the control map MP4-2, the dumping correction amount is set so that the final control amount (dumping force) in the dumping control becomes large to prevent the steering speed θ' from becoming large with increase in the absolute value of the product [θ'·T], that is, increase in the strength of the passive operational intention in the passive operation (negative side). It is to be noted that in the control map MP4-2, the dumping correction amount becomes zero when the absolute value of the product [θ'·T] is lower than a first predetermined value (a first predetermined value in the control map MP4-2) set in advance, and becomes constant when the absolute value of the product [θ'·T] is higher than a second predetermined value (a second predetermined value in the control map MP4-2) set in advance.

The fifth gain of the above equation (6) is set by the control map MP7-2. The ECU 20 computes the fifth gain from the control map MP7-2 based on the vehicle speed V. The control map MP7-2 is a map in which the vehicle speed V and the fifth gain are corresponded to each other, and is stored in advance in the storage unit. In the control map MP7-2, the fifth gain becomes large with increase in the vehicle speed V. In the control map MP7-2, the fifth gain does not become zero but becomes constant at a relatively small value even when the vehicle speed V is lower than a first predetermined vehicle speed (a first predetermined vehicle speed in the control map MP7-2) set in advance, and becomes constant at a relatively high value when the vehicle speed V is higher than a second predetermined vehicle speed (a second predetermined vehicle speed in the control map MP7-2) set in advance, similarly to the fourth gain.

As a result, the ECU 20 can prevent the burden of the driver from becoming relatively large in a situation where the steering 4 rapidly returns against the intention of the driver and power is used for its adjustment, for example, as described above. That is, the ECU 20 can set the target steering control amount so that the assist force by the EPS device 8 becomes relatively large as the intention of the passive operation by the driver becomes relatively strong, in other words, the steering power P1 based on the product [θ'·T] is smaller than the first power reference value ThP1 and the absolute value of the steering power P1 becomes relatively large. Therefore, the drive supporting device 1 can compute the steering control amount reflecting the intention of the driver and reflect the same in the driving support, and can carry out the driving support so that the steering speed does not become too high and the burden of the driver can be alleviated in the above cases.

The drive supporting device 1 according to the embodiment described above includes the supporting device 3 mounted on the vehicle 2 and capable of executing the driving support in the vehicle 2, the steering angle sensor 10 that detects a steering angle of the steering 4 of the vehicle 2, the torque sensor 11 that detects a torque acting on the shaft 5 that rotates with the steering 4, and the ECU (controller) 20 that controls the supporting device 3. The ECU 20 changes the content of the driving support by the supporting device 3 between the case in which a steering power (steering power P1, P2, etc.) corresponding to a product of a parameter associated with the steering angle detected by the steering angle sensor 10 and a parameter associated with the torque detected by the torque sensor 11 is greater than or equal to a reference value (first power reference value ThP1, second power reference value ThP2, etc.) set in advance, and the case in which the steering power is smaller than the reference value.

Furthermore, the drive supporting device 1 serving as the operation detecting device according to the embodiment described above includes the steering angle sensor 10 that detects a steering angle of the steering 4 of the vehicle 2, the torque sensor 11 that detects a torque acting on the shaft 5 that rotates with the steering 4, and the ECU (determining device) 20 that determines the active operation on the steering 4 and the passive operation on the steering 4 based on a parameter associated with the steering angle detected by the steering angle sensor 10 and a parameter associated with the torque detected by the torque sensor 11.

Therefore, the drive supporting device 1, the ECU 20 can determine the intention of the driver based on the steering power and realize the driving support reflecting the intention of the driver, and, for example, can carry out the driving support in which the sense of discomfort is small for the driver.

It is to be noted that in the description made above, the ECU 20 has been described to calculate the steering work amount W based on the product of the steering angle θ detected by the steering angle sensor 10 and the steering torque T detected by the torque sensor 11, but is not limited thereto. For example, the ECU 20 may calculate the steering work amount W using a yaw rate YR of the vehicle 2 corresponding to the parameter associated with the steering angle θ detected by the yaw rate sensor 14 instead of the steering angle θ. The yaw rate YR of the vehicle 2 tends to become a value corresponding to the steering angle θ detected by the steering angle sensor 10, and has a relationship of increasing with increase in the steering angle θ. That is, the yaw rate YR of the vehicle 2 and the steering angle θ are basically in a proportional relationship.

In this case, for example, the ECU 20 converts the yaw rate YR of the vehicle 2 detected by the yaw rate sensor 14 to the steering angle θ based on the vehicle model of the vehicle 2 set in advance (note that in the following description, the steering angle calculated from the yaw rate YR is sometimes referred to as "θfYR"). The ECU 20 may then calculate the steering work amount W based on a product [θfYR·T] of the steering angle θfYR calculated from the yaw rate YR and the steering torque T detected by the torque sensor 11. That is, in this case, the steering work amount W is calculated based on the product [θfYR·T] of the steering angle θfYR calculated according to the yaw rate YR of the vehicle 2 and the steering torque T detected by the torque sensor 11 as the parameter associated with the steering angle detected by the yaw rate sensor 14. In this case, the yaw rate sensor 14 corresponds to the steering angle detecting device.

The ECU 20 then determines the active operation and the passive operation based on the steering work amount W corresponding to the product [θfYR·T]. The ECU 20 detects the active operation on the steering 4 when the steering work amount W based on the product [θfYR·T] is greater than or equal to the work amount reference value ThW, and detects the passive operation on the steering 4 when the steering work amount W is smaller than the work amount reference value ThW.

Thus, when correction steering (counter steering operation) is carried out by the driver with respect to disturbance such as when the vehicle 2 is travelling on a slant path (a travelling path having an inclination along the travelling path width direction) and when a crosswind is acting on the vehicle 2, the drive supporting device 1 can eliminate the influence of the correction steering and carry out the determination of the active operation and the passive operation while suppressing false determination. For example, if the correction steering is carried out with respect to the disturbance by the driver, there is a risk that the steering angle θ detected by the steering angle sensor 10 may become large and the steering work amount W based on the product [θ·T] may also become large, and thus there is a risk that the ECU 20 may determine the operation as the active operation although it is the passive operation. In contrast, the drive supporting device 1 can carry out the determination using the steering work amount W based on the product [θfYR·T] to determine as the passive operation when the correction steering is being carried out with respect to the disturbance by the driver. As a result, the drive supporting device 1 can eliminate the influence of the correction steering with respect to the disturbance such as the slant path and the crosswind, and appropriately realize the driving support reflecting the intention of the driver.

The ECU 20 may also directly calculate the steering work amount W based on the product [YR·T] of the yaw rate YR and the steering torque T without converting the yaw rate YR of the vehicle 2 detected by the yaw rate sensor 14 to the steering angle θ. In this case, the work amount reference value ThW may be appropriately converted in correspondence with the product [YR·T]. The ECU 20 may then detect the active operation on the steering 4 when the steering work amount W based on the product is greater than or equal to the work amount reference value ThW, and detect the passive operation on the steering 4 when the steering work amount W is smaller than the work amount reference value ThW.

[Second Embodiment]

Figure 10:
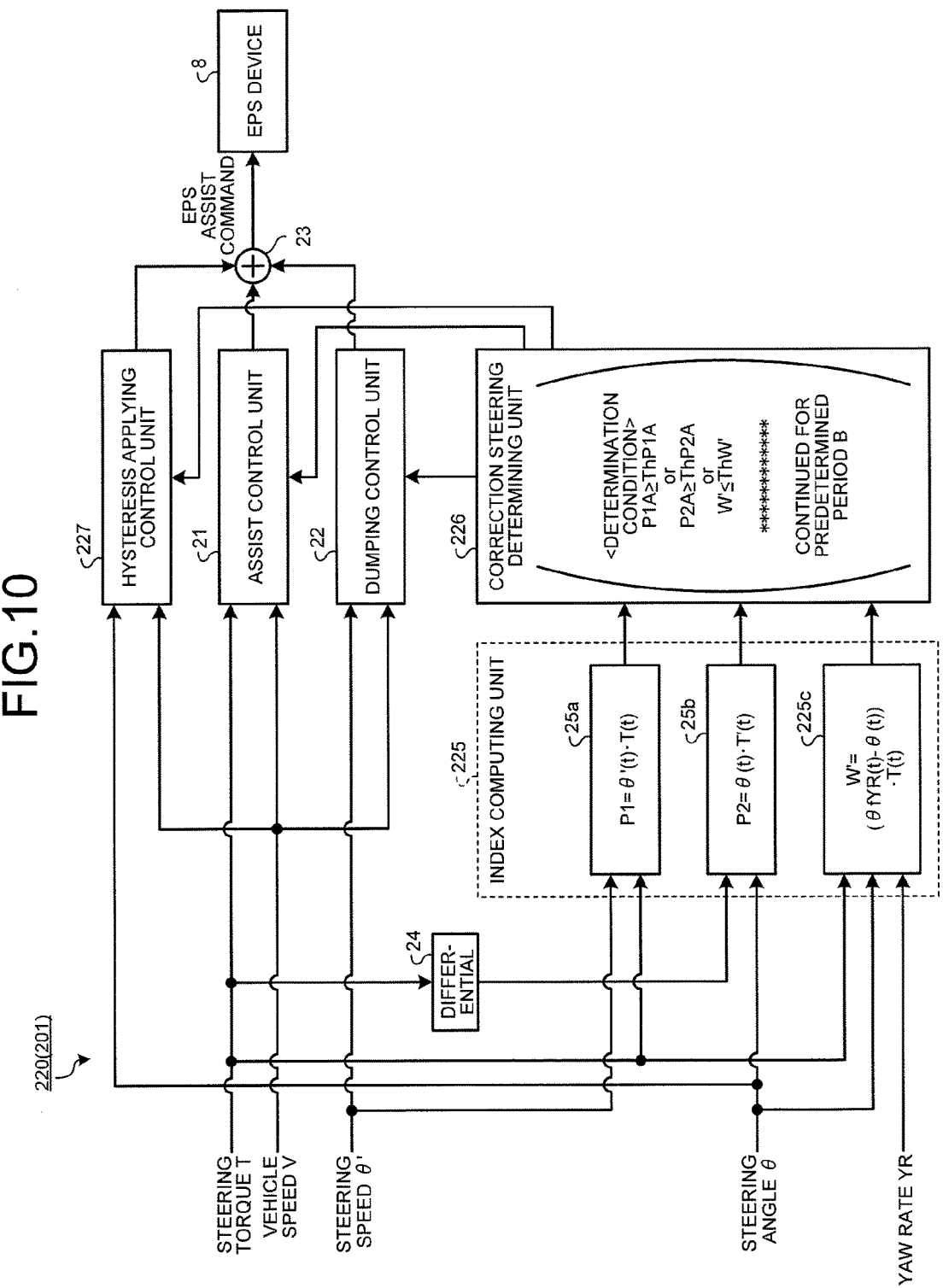
FIG. 10 is a block diagram illustrating one example of a schematic configuration of an ECU according to a second embodiment.
Figure 11:
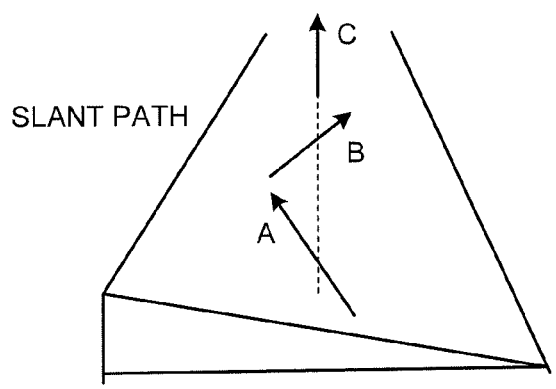
FIG. 11 is a schematic view describing a travelling state of a vehicle on a slant path.
Figure 12:
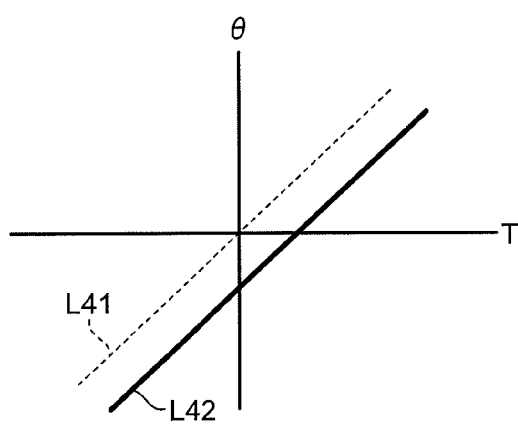
FIG. 12 is a diagrammatic view describing a steering angle and a steering torque of when correction steering with respect to disturbance is carried out by the driver.
Figure 13:
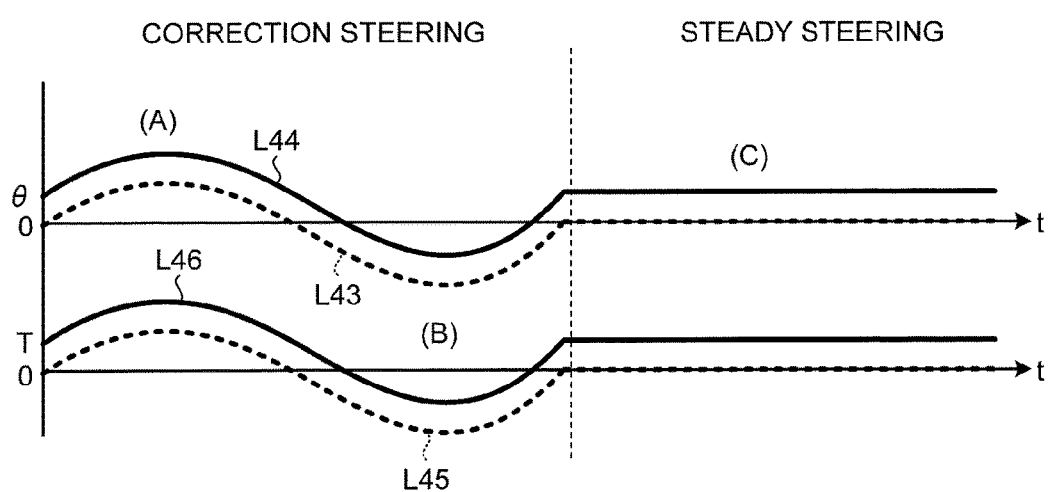
FIG. 13 is a diagrammatic view describing the steering angle and the steering torque of when the correction steering with respect to the disturbance is carried out by the driver.
Figure 14:
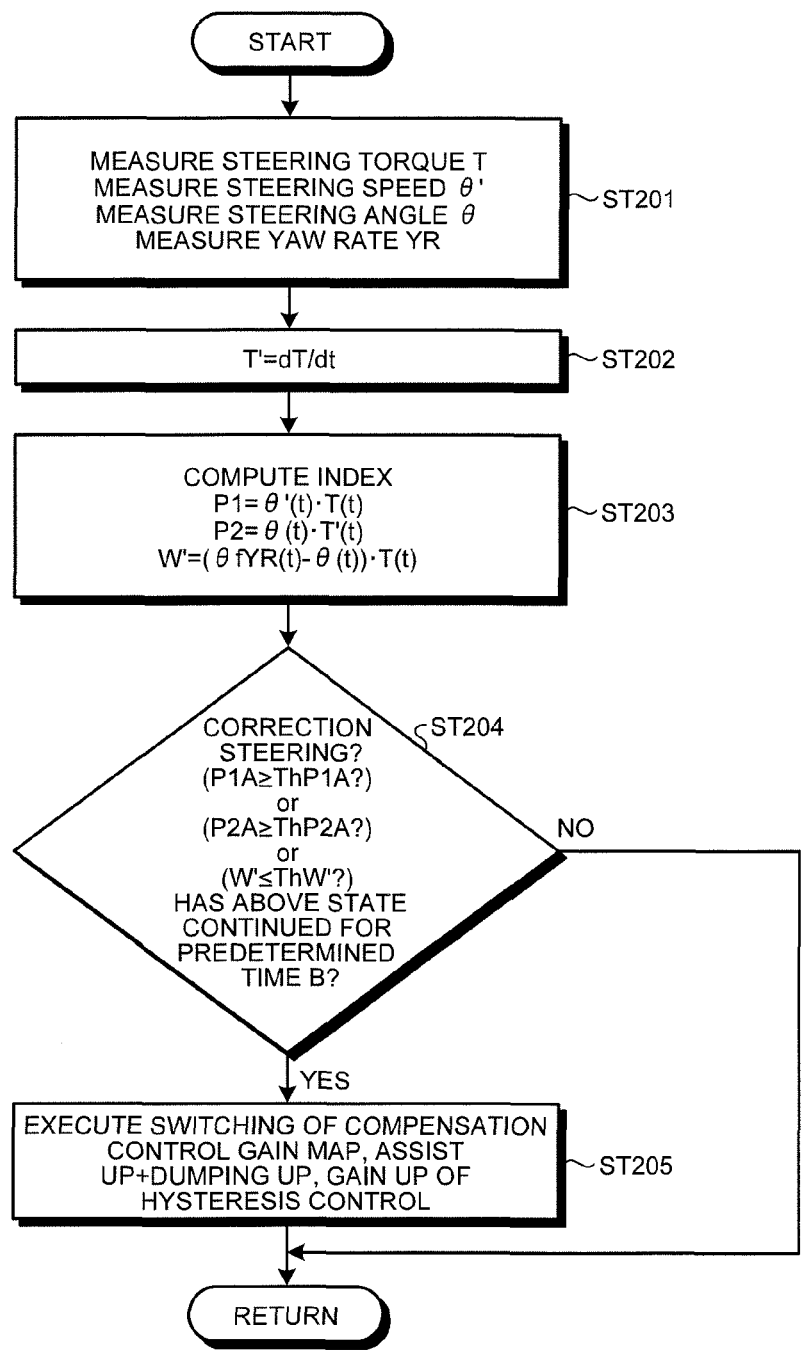
FIG. 14 is a flowchart describing one example of a control by the ECU according to the second embodiment.
Figure 15:
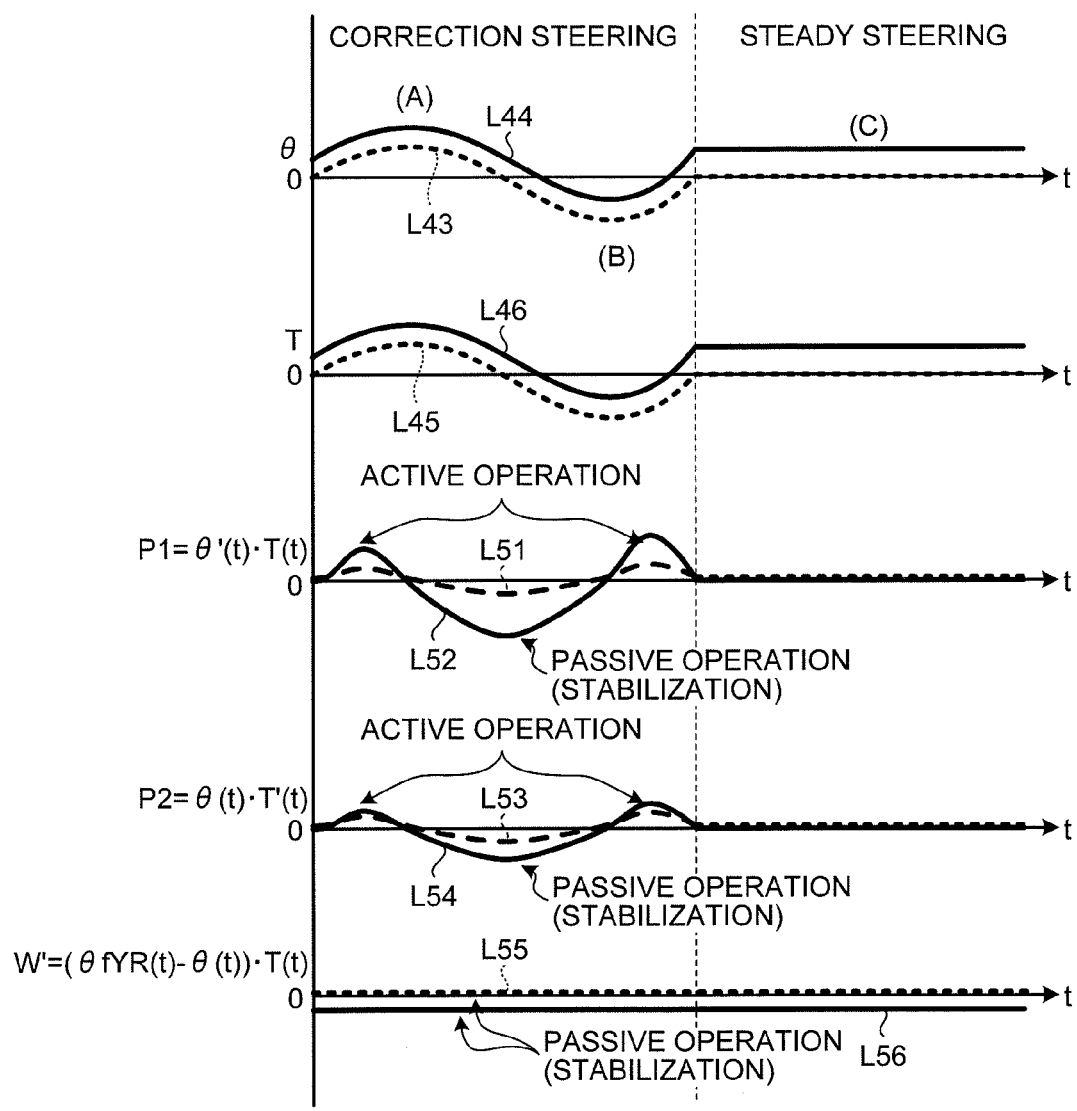
FIG. 15 is a diagrammatic view describing one example of the determination of the correction steering by the ECU according to the second embodiment.

FIG. 10 is a block diagram illustrating one example of a schematic configuration of an ECU according to a second embodiment. FIG. 11 is a schematic view describing a travelling state of a vehicle on a slant path, and FIG. 12 and FIG. 13 are diagrammatic views describing a steering angle and a steering torque of when correction steering with respect to disturbance is carried out by the driver. FIG. 14 is a flowchart describing one example of a control by the ECU according to the second embodiment. FIG. 15 is a diagrammatic view describing one example of the determination of the correction steering by the ECU according to the second embodiment. A drive supporting device, an operation detecting device, and a controller according to the second embodiment differ from the first embodiment in determining the correction steering with respect to the disturbance. In addition, redundant description of the configurations, operations, and effects common to the embodiment described above will be omitted as much as possible. Furthermore, FIG. 1 and the like will be appropriately referenced to (similarly in the embodiments described below) for each configuration of the drive supporting device, the operation detecting device, and the controller according to the second embodiment.

A drive supporting device 201 of the present embodiment illustrated in FIG. 10 includes an ECU 220 serving as both a controller and a determining device.

Hereinafter, the extraction of the driver steering state caused by the change in environment using a steering power P and a steering work amount W' will be described.

The ECU 220 of the present embodiment determines the correction steering with respect to the disturbance when a period in which an amplitude of the steering power P is greater than or equal to an amplitude threshold value defined in advance has continued longer than or equal to a predetermined period set in advance. Here, the correction steering with respect to the disturbance is a correction operation carried out by the driver via a steering 4 with respect to the disturbance when a vehicle 2 is travelling on the slant path, the crosswind is acting on the vehicle 2, and the like, as described above.

For example, when the vehicle 2 is travelling on the slant path as illustrated in FIG. 11, periodic correction steering is carried out by the driver, as illustrated with an arrow A and an arrow B, and then tends to shift to a steady steering state, as illustrated with an arrow C. In such a case, a line L42 representing steering angle θ-steering torque T at the time of travelling on the slant path is offset to the negative side with respect to a line L41 representing steering angle θ-steering torque T at the time of travelling on a flat path, as illustrated in FIG. 12. Furthermore, as illustrated in FIG. 13, a line L44 representing the steering angle θ and a line L46 representing the steering torque T at the time of travelling on the slant path along a time axis t are both offset according to the inclination of the slant path with respect to a line L43 representing the steering angle θ and the line L45 representing the steering torque T at the time of travelling on the flat path. For example, if the steering torque T is greater than a predetermined value, it can be detected that the inclination of the slant path is large (disturbance is large), but actually, a steering speed $\theta'$ at the time of the returning operation fluctuates by the magnitude and the like of the steering torque T, and the steering torque T in the correction steering also fluctuates as a result. Thus, determination of the correction steering with respect to the disturbance by the simple body of the steering torque T and the like tends to be substantially difficult as false determination may be made assuming that the correction steering is an active operation, for example.

The ECU 220 of the present embodiment thus determines the correction steering with respect to the disturbance as a passive operation based on the amplitude of the steering power P so that the correction steering can be accurately determined. Here, the amplitude of the steering power P can be calculated based on, for example, a difference (peak to peak difference) of a maximum value (peak) and a minimum value (peak) of the steering power P, an absolute value of the maximum value of the steering power, an absolute value of the minimum value of the steering power, or the like.

It is to be noted that hereinafter, the ECU 220 will be described to determine the correction steering with respect to the disturbance using a steering power P1 based on a product $[\theta' \cdot T]$ and a steering power P2 based on a product $[\theta \cdot T']$, but is not limited thereto. The ECU 220 may determine the correction steering with respect to the disturbance using one of the steering power P1 based on the product $[\theta' \cdot T]$ and the steering power P2 based on the product $[\theta \cdot T']$, or may determine the correction steering with respect to the disturbance using the steering power P in which the product $[\theta' \cdot T]$ and the product $[\theta \cdot T']$ are synthesized.

The ECU 220 of the present embodiment determines the correction steering with respect to the disturbance when a period in which the amplitude of the steering power P1 is greater than or equal to an amplitude threshold value ThP1A defined in advance has continued longer than or equal to a predetermined period B set in advance. The ECU 220 also determines the correction steering with respect to the disturbance when a period in which the amplitude of the steering power P2 is greater than or equal to an amplitude threshold value ThP2A defined in advance has continued longer than or equal to the predetermined period B. It is to be noted that the amplitude threshold value ThP1A and the amplitude threshold value ThP2A are set to values at which the correction steering with respect to the disturbance can be determined based on the actual vehicle evaluation, and the like, for example. The predetermined period B may also be set in advance, for example, as a period in which the correction steering with respect to the disturbance can be reliably discriminated.

The ECU 220 of the present embodiment may further determine the correction steering with respect to the disturbance using a steering work amount W' calculated in view of a steering angle $\theta 0$ at the time of straight-ahead travelling of the vehicle 2, or the steering work amount W' calculated in view of a steering angle $\theta fYR$ calculated from a yaw rate YR. In this case, the steering work amount W' is calculated based on a product $[(\theta 0 - \theta) \cdot T]$ of a steering angle $\theta 0 - \theta$ corresponding to a difference of the steering angle $\theta$ detected by a steering angle sensor 10 and the steering angle $\theta 0$ at the time of straight-ahead travelling of the vehicle 2 as a parameter associated with the steering angle $\theta$ detected by the steering angle sensor 10 and the steering torque T detected by a torque sensor 11. Alternatively, the steering work amount W' may be calculated based on a product $[(\theta fYR - \theta) \cdot T]$ of a steering angle $\theta fYR - \theta$ corresponding to a difference of the steering angle $\theta$ detected by the steering angle sensor 10 and the steering angle $\theta fYR$ calculated according to the yaw rate YR of the vehicle 2, and the steering torque T detected by the torque sensor 11. Here, the steering angle $\theta 0$ at the time of straight-ahead travelling is typically a steering angle at a neutral position of the steering 4, for example, 0°. As described above, the steering angle $\theta fYR$ is calculated from the yaw rate YR of the vehicle 2 detected by the yaw rate sensor 14 based on the vehicle model of the vehicle 2 set in advance. The steering work amount W' calculated in the above manner having the steering angle $\theta 0$ or the steering angle $\theta fYR$ as a reference corresponds to one that represents the magnitude (strength) of the correction steering (passive operation) with respect to the disturbance. It is to be noted that the product $[(\theta 0 - \theta) \cdot T]$ and the product $[(\theta fYR - \theta) \cdot T]$ basically become negative values.

Then, it is also possible that the ECU 220 determines the correction steering with respect to the disturbance as the passive operation based on the steering work amount W' calculated with the steering angle $\theta 0$ or the steering angle $\theta fYR$ as the reference in the above manner so that the correction steering can be accurately determined. The ECU 220, for example, determines the correction steering with respect to the disturbance when a period in which the negative magnitude of the steering work amount W' is smaller than or equal to a predetermined work amount ThW' defined in advance has continued longer than or equal to the predetermined period B. It is to be noted that the predetermined work amount ThW' is set to a value at which the correction steering with respect to the disturbance can be determined based on the actual vehicle evaluation, and the like, for example. The predetermined period B may also be set in advance as a period in which the correction steering with respect to the disturbance can be reliably discriminated, for example, as described above.

The drive supporting device 201 of the present embodiment then reflects the determination result of the correction steering with respect to the disturbance as described above in the driving support by the supporting device 3, which is the driving support of a steering system carried out by an EPS device 8 here. That is, the ECU 220 of the present embodiment controls the EPS device 8 based on the determination result of the correction steering with respect to the disturbance. When the correction steering with respect to the disturbance is detected, the ECU 220 thus carries out the driving support corresponding to the correction steering with respect to the disturbance.

When it can be determined that the correction steering with respect to the disturbance is carried out, for example, the ECU 220 carries out the driving support such that at least one of an assist force, a dumping force, and a frictional force generated by the EPS device 8 becomes large compared to when it cannot be determined that the correction steering with respect to the disturbance is carried out. The drive supporting device 201 thus can impart stability to the correction steering and can alleviate the burden of the correction steering by the driver by the driving support corresponding to the correction steering with respect to the disturbance.

It is to be noted that the case in which it can be determined that the correction steering with respect to the disturbance is carried out is a case in which a period in which the amplitude of the steering power P1, P2 is greater than or equal to the amplitude threshold value ThP1A, ThP2A defined in advance has continued for the predetermined period B set in advance, for example. The case in which it cannot be determined that the correction steering with respect to the disturbance is carried out is a case in which the amplitude of the steering power P1, P2 is smaller than the amplitude threshold value ThP1A, ThP2A or a case in which a period in which the amplitude of the steering power P1, P2 is greater than or equal to the amplitude threshold value ThP1A, ThP2A is shorter than the predetermined period B. Furthermore, when the correction steering with respect to the disturbance is determined using the steering work amount W', the case in which it can be determined that the correction steering with respect to the disturbance is carried out may include a case in which a period in which the steering work amount W' is smaller than or equal to the predetermined work amount ThW' defined in advance has continued longer than or equal to the predetermined period B set in advance, for example. Similarly, the case in which it cannot be determined that the correction steering with respect to the disturbance is carried out may include, for example, a case in which the steering work amount W' is greater than the predetermined work amount ThW' or a case in which a period in which the steering work amount W' is smaller than or equal to the predetermined work amount ThW' is shorter than the predetermined period B.

When it can be determined that the correction steering with respect to the disturbance is carried out, the ECU 220 may also carry out the driving support of causing the EPS device 8 to add an offset torque according to the magnitude of the disturbance such as the inclination of the slant path and the strength of the crosswind, compared to when it cannot be determined that the correction steering is carried out. In this case as well, the drive supporting device 201 can impart stability to the correction steering and alleviate the burden of the correction steering by the driver by the driving support corresponding to the correction steering with respect to the disturbance.

Specifically, as illustrated in FIG. 10, the ECU 220 of the present embodiment is configured to further function-conceptually include a hysteresis applying control unit 227, an index computing unit 225, a correction steering determining unit 226, and the like, in addition to the configuration of FIG. 5 described in the first embodiment, for example. It is to be noted that in the present figure, the illustration of an index computing unit 25, an active operation determining unit 26, a driving support changing unit 27, and the like is omitted.

The hysteresis applying control unit 227 calculates a hysteresis applying control amount in a hysteresis applying control. The hysteresis applying control unit 227 receives a detection signal corresponding to the steering angle θ from the steering angle sensor 10, and receives a detection signal corresponding to a vehicle speed V from a vehicle speed sensor 13. The hysteresis applying control unit 227 computes a torque (frictional torque) corresponding to a target frictional force as the hysteresis applying control amount through various methods based on the input detection signals. The hysteresis applying control unit 227 outputs a current command value signal corresponding to the computed hysteresis applying control amount to an adder 23.

In this case, the adder 23 receives a current command value signal corresponding to a basic assist control amount from an assist control unit 21, receives a current command value signal corresponding to a dumping control amount from a dumping control unit 22, and receives the current command value signal corresponding to the hysteresis applying control amount from the hysteresis applying control unit 227. The adder 23 computes a target steering control amount (final target torque) in which the basic assist control amount, the dumping control amount, and the hysteresis applying control amount are added based on the input current command value signals. The adder 23 outputs the current command value signal corresponding to the computed target steering control amount to the EPS device 8 as the EPS assist command, and controls the motor 8a of the EPS device 8. The ECU 20 thereby realizes the assist control, the dumping control, and the hysteresis applying control described above. This becomes the basic control.

The index computing unit 225 computes an index for the determination of the correction steering with respect to the disturbance. The index computing unit 225 of the present embodiment is configured to include a first power computation portion 25a that computes the steering power P1 based on the product [θ'·T], a second power computation portion 25b that computes the steering power P2 based on the product [θ·T], and a work amount computation portion 225c that computes the steering work amount W' based on the product [(θfYR−θ)·T] as the index. The first power computation portion 25a and the second power computation portion 25b of the index computing unit 25 described above are used for the first power computation portion 25a and the second power computation portion 25b here. It is to be noted that the index computing unit 225 may be configured to include a work amount computation portion that computes the steering work amount W' based on the product [(θ0−θ)·T] in place of the work amount computation portion 225c that computes the steering work amount W' based on the product [(θfYR−θ)·T].

The work amount computation portion 225c receives a detection signal corresponding to the steering angle θ from the steering angle sensor 10, receives a detection signal corresponding to the steering torque T from the torque sensor 11, and receives the yaw rate YR of the vehicle 2 from the yaw rate sensor 14. The work amount computation portion 225c computes a steering angle θfYR(t) from a yaw rate YR(t) in the current control period based on the input detection signals, and computes a difference of the θfYR(t) and a steering angle θ(t) in the current control period. The work amount computation portion 225c then computes the steering work amount W' by computing a product of the difference (θfYR(t)−θ(t)) and a steering torque T(t). The work amount computation portion 225c outputs a computation signal corresponding to the computed steering work amount W' to the correction steering determining unit 226.

The correction steering determining unit 226 discriminates the correction steering with respect to the disturbance by the driver. The correction steering determining unit 226 receives a computation signal corresponding to the steering power P1 from the first power computation portion 25a, receives a computation signal corresponding to the steering power P2 from the second power computation portion 25b, and receives the computation signal corresponding to the steering work amount W' from the work amount computation portion 225c. The correction steering determining unit 226 determines whether or not the correction steering with respect to the disturbance is carried out by the driver based on the input computation signals, and the amplitude threshold value ThP1A, the amplitude threshold value ThP2A, and the predetermined work amount ThW' set in advance as described above.

Here, the correction steering determining unit 226 determines that the correction steering with respect to the disturbance is carried out by the driver when determining that a period satisfying one or more of the following conditions 4 to 6 has continued for a predetermined period B set in advance. On the other hand, the correction steering determining unit 226 determines that the correction steering with respect to the disturbance is not carried out when determining that the period satisfying one or more of the following conditions 4 to 6 is shorter than the predetermined period B or when determining that none of the following conditions 4 to 6 is satisfied. The correction steering determining unit 226 then outputs a control signal corresponding to the determination result to the assist control unit 21, the dumping control unit 22, and the hysteresis applying control unit 227.

(Condition 4) The amplitude P1A of the steering power P1 is greater than or equal to the amplitude threshold value ThP1A (P1A≥ThP1A).

(Condition 5) The amplitude P2A of the steering power P2 is greater than or equal to the amplitude threshold value ThP2A (P2A≥ThP2A).

(Condition 6) The steering work amount W' is smaller than or equal to the predetermined work amount ThW' (W'≤ThW').

It is to be noted that the correction steering determining unit 226 has been described here to determine that the correction steering with respect to the disturbance is carried out by the driver when determining that the period satisfying one or more of the above conditions 4 to 6 has continued for the predetermined period B set in advance, but is not limited thereto. The correction steering determining unit 226 may determine that the correction steering with respect to the disturbance is carried out by the driver when determining that the period satisfying all of the above conditions 4 to 6 has continued for the predetermined period B.

When determining that the correction steering is carried out, for example, the correction steering determining unit 226 increases the assist force and the dumping force generated by the EPS device 8 compared to when determining that the correction steering is not carried out, and also outputs a switching signal of a control map and the like for increasing a control gain in the hysteresis applying control to the assist control unit 21, the dumping control unit 22, and the hysteresis applying control unit 227.

One example of the control by the ECU 220 will be described next with reference to FIG. 14.

The ECU 220 first measures the steering torque T, the steering speed θ', the steering angle θ, and the yaw rate YR based on the detection results of the steering angle sensor 10, the torque sensor 11, and the yaw rate sensor 14 (step ST201).

Next, a differential computing unit 24 of the ECU 220 computes a torque differential value T'=dT/dt based on the steering torque T measured in step ST201 (step ST202).

Next, the index computing unit 225 of the ECU 220 computes the steering power P1=θ'(t)·T(t), the steering power P2=θ(t)·T'(t), and the steering work amount W'=(θfYR(t)−θ(t))·T(t) in the current control period based on the steering torque T, the steering speed θ', the steering angle θ, and the yaw rate YR measured in step ST201 and the torque differential value T' computed in step ST202 (step ST203).

Next, the correction steering determining unit 226 of the ECU 220 determines whether or not the correction steering with respect to the disturbance is carried out by the driver based on the steering power P1, the steering power P2, and the steering work amount W' computed in step ST203 (step ST204). For example, the correction steering determining unit 226 determines whether or not the correction steering with respect to the disturbance is carried out by the driver by determining whether or not a state of (P1A≥ThP1A) or (P2A≥ThP2A) or (W'≤ThW') has continued for the predetermined period B or longer.

The correction steering determining unit 226 of the ECU 220 carries out the following processing when determining that the correction steering with respect to the disturbance is carried out by the driver in step ST204 (step ST204: Yes). That is, the correction steering determining unit 226 increases the assist force and the dumping force generated by the EPS device 8, and also outputs a switching signal of a compensation control map and the like for increasing the control gain in the hysteresis applying control to the assist control unit 21, the dumping control unit 22, and the hysteresis applying control unit 227 (step ST205), terminates the control period of this time and proceeds to the control period of next time.

When it is determined that the correction steering with respect to the disturbance is not carried out by the driver in step ST204 (step ST204: No), the driving support changing unit 27 of the ECU 220 terminates the control period of this time and proceeds to the control period of next time.

The drive supporting device 201 configured as described above can accurately determine the correction steering with respect to the disturbance by determining the correction steering with respect to the disturbance based on the amplitudes of the steering powers P1, and P2 and the steering work amount W'. For example, when the vehicle 2 is travelling on the slant path as illustrated in FIG. 11, the steering power P1, the steering power P2, and the steering work amount W' fluctuate as illustrated in FIG. 15. That is, a line L52 representing the steering power P1 and a line L54 representing the steering power P2 at the time of travelling on the slant path along a time axis t both tend to have the amplitude that becomes relatively large according to the periodic correction steering for corresponding to the disturbance with respect to a line L51 representing the steering power P1 and a line L53 representing the steering power P2 at the time of travelling on the flat path. In other words, when a state in which the steering powers P1, and P2 are fluctuating as indicated with the lines L52, and L54 has continued for a predetermined period, it can be estimated that the periodic correction steering is carried out by the driver in correspondence with a situation where some kind of disturbance is occurring, and that there is a state in which the active operation and the passive operation are frequently repeated. Furthermore, a line L56 representing the steering work amount W' at the time of travelling on the slant path along the time axis t becomes in a state offset to the negative side according to the strength of the disturbance with respect to a line L55 representing the steering work amount W' at the time of travelling on the flat path. The drive supporting device 201 can appropriately and accurately determine the correction steering, which is one type of passive operation by the driver, by using the above fact and carrying out the determination using the conditions 4 to 6 described above.

The drive supporting device 201 then reflects the determination result of the correction steering with respect to the disturbance as described above in the driving support by the supporting device 3, here the driving support of the steering system carried out by the EPS device 8. The drive supporting device 201 thus can impart stability to the correction steering, obtain a settled steering property, and also alleviate the burden of the correction steering by the driver by the driving support.

The drive supporting device 201, the ECU 220 according to the embodiment described above can determine the intention of the driver based on the steering power and realize the driving support reflecting the intention of the driver, and for example, can carry out the driving support in which the sense of discomfort is small for the driver.

According to the drive supporting device 201 of the embodiment described above, the ECU 220 further determines the correction steering with respect to the disturbance when the period in which the amplitude of the steering power is greater than or equal to the amplitude threshold value defined in advance has continued longer than or equal to a predetermined period set in advance. The steering work amount is also calculated based on the product of the steering angle corresponding to the difference of the steering angle detected by the steering angle sensor 10 and the steering angle at the time of straight-ahead travelling of the vehicle 2, or the steering angle corresponding to the difference of the steering angle detected by the steering angle sensor 10 and the steering angle calculated according to the yaw rate of the vehicle 2 as the parameter associated with the steering angle detected by the steering angle sensor 10, and the steering torque detected by the torque sensor 11. The ECU 220 then determines the correction steering with respect to the disturbance based on the steering work amount. When it can be determined that the correction steering with respect to the disturbance is carried out, the ECU 220 increases at least one of the assist force generated by the EPS device 8, the dumping force generated by the EPS device 8, and the frictional force generated by the EPS device 8, compared to when it cannot be determined that the correction steering with respect to the disturbance is carried out.

Therefore, according to the drive supporting device 201, the ECU 220 can appropriately detect the correction steering with respect to the disturbance by the driver, and can realize the driving support in which the sense of discomfort is small according to the correction steering with respect to the disturbance.

[Third Embodiment]

Figure 16:
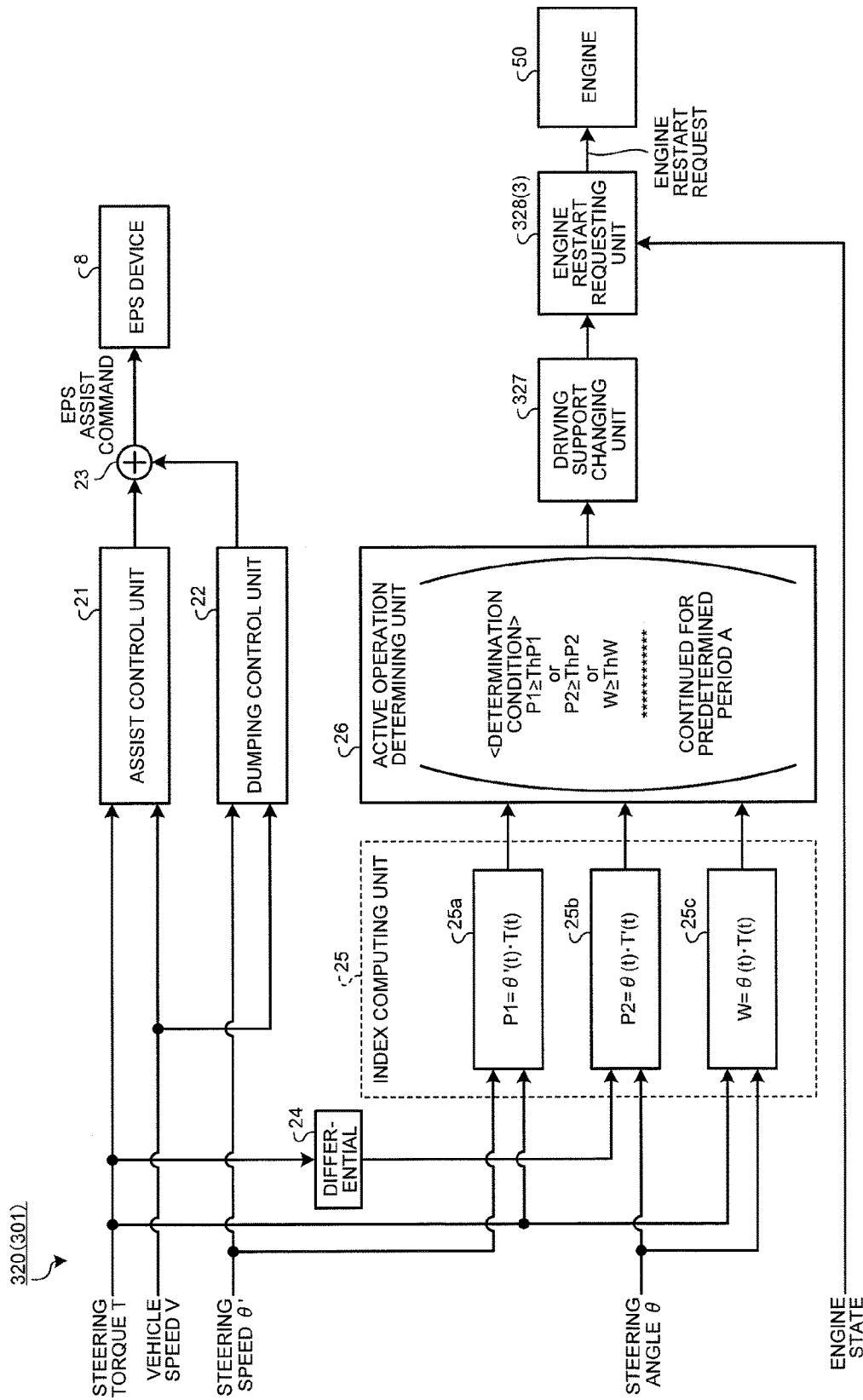
FIG. 16 is a block diagram illustrating one example of a schematic configuration of an ECU according to a third embodiment.
Figure 17:
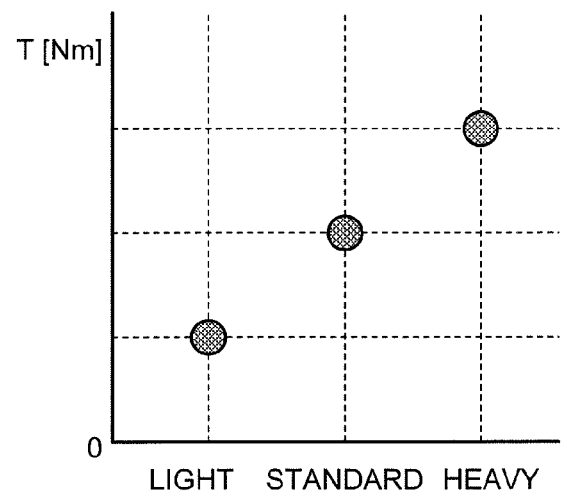
FIG. 17 is a schematic view describing a case of determining the intention of the driver based on a steering torque.
Figure 18:
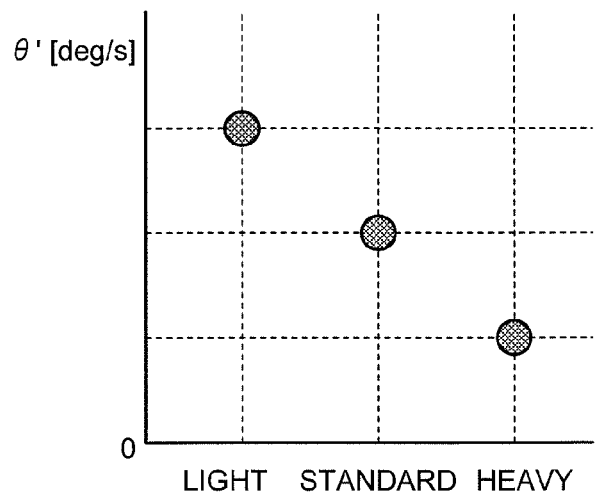
FIG. 18 is a schematic view describing a case of determining the intention of the driver based on a steering speed.
Figure 19:
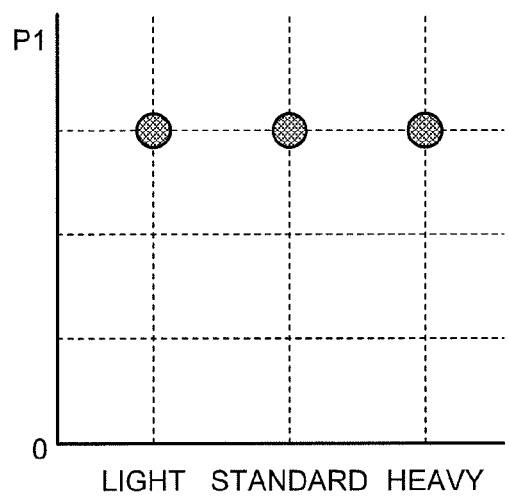
FIG. 19 is a schematic view describing a case of determining the intention of the driver based on a steering power.

FIG. 16 is a block diagram illustrating one example of a schematic configuration of an ECU according to a third embodiment. FIG. 17 is a schematic view describing a case of determining the intention of the driver based on a steering torque. FIG. 18 is a schematic view describing a case of determining the intention of the driver based on a steering speed. FIG. 19 is a schematic view describing a case of determining the intention of the driver based on a steering power. FIG. 20 is a flowchart describing one example of a control by the ECU according to the third embodiment. A drive supporting device, an operation detecting device, and a controller according to the third embodiment are different from the first and second embodiments in the target of driving support.

A drive supporting device 301 of the present embodiment illustrated in FIG. 16 includes an ECU 320 serving as both a controller and a determining device.

The drive supporting device 301 of the present embodiment reflects the determination result of an active operation and a passive operation based on a steering power in a driving support control of a drive system of a vehicle 2, here driving support by a so-called stop & start system (S & S system).

A supporting device 3 of the present embodiment is configured to include an engine restart requesting unit 328 serving as an operation unit. The engine restart requesting unit 328 controls an engine 50 serving as a power source that generates power for causing the vehicle 2 to travel, and carries out the S & S driving support by automatically starting and stopping the engine 50. Here, the S & S driving support is the driving support of realizing enhancement in fuel economy performance by suppressing the consumption of fuel and using an inertia travelling state of the vehicle 2 involved therewith by automatically stopping and automatically restarting the engine 50 during the travelling of the vehicle 2, for example.

The engine restart requesting unit 328 automatically stops the engine 50 by cutting the supply of fuel to a combustion chamber of the engine 50 (fuel cut) thus causing the engine 50 to be in a non-operating state when an engine stop permitting condition (a stop permitting condition of the engine 50) for stopping the engine 50 is met during the travelling of the vehicle 2. The engine restart requesting unit 328 also returns from the fuel cut state to the combustion chamber and restarts the engine 50 thus causing the engine 50 to be in an operating state when the engine 50 is in the non-operating state during the travelling of the vehicle 2, and for example, when an engine restarting condition for restarting the engine 50 is met. It is to be noted that the engine restart requesting unit 328 may be used as a part of the ECU 320.

The ECU 320 of the present embodiment uses the determination result of the active operation and the passive operation as the engine restarting condition by the engine restart requesting unit 328. The ECU 320 controls the engine restart requesting unit 328 configuring the supporting device 3 based on the determination result, and changes the content of the driving support by the supporting device 3. That is, the ECU 320 controls the engine restart requesting unit 328 based on a steering power and the like corresponding to a product of a parameter associated with a steering angle detected by a steering angle sensor 10 and a parameter associated with a steering torque detected by a torque sensor 11, and changes the content of the driving support by the supporting device 3.

The ECU 320 of the present embodiment is configured such that the supporting device 3 includes the engine restart requesting unit 328, and thus the content of the driving support of the drive system carried out by the engine restart requesting unit 328 can be changed between the case of the active operation and the case of the passive operation. Here, by way of example, the ECU 320 changes the content of the driving support by the supporting device 3 based on a steering power P1 based on a product [θ'·T], a steering power P2 based on a product [θ·T], a steering work amount W based on a product [θ·T], and the like.

The ECU 320 controls the engine restart requesting unit 328 to carry out the driving support of starting the engine 50 when it can be determined that the active operation is carried out by the driver, and does not carry out the driving support of starting the engine 50 when it can be determined that the passive operation is carried out by the driver. For example, the ECU 320 carries out the driving support of starting the engine 50 when the steering power P1 based on the product [θ'·T] is greater than or equal to a first power reference value ThP1, and does not carry out the driving support of starting the engine 50 when the steering power P1 based on the product [θ'·T] is smaller than the first power reference value ThP1. Furthermore, for example, the ECU 320 may carry out the driving support of starting the engine 50 when the steering power P2 based on the product [θ·T] is greater than or equal to a second power reference value ThP2, and may not carry out the driving support of starting the engine 50 when the steering power P2 based on the product [θ·T] is smaller than the second power reference value ThP2. Moreover, the ECU 320 may carry out the driving support of starting the engine 50 when the steering work amount W based on the product [θ·T] is greater than or equal to a work amount reference value ThW, and may not carry out the driving support of starting the engine 50 when the steering work amount W based on the product [θ·T] is smaller than the work amount reference value ThW.

In the ECU 320 of the present embodiment, a driving support changing unit 327 changes the content of the driving support by the engine restart requesting unit 328 according to the determination result of the active operation and the passive operation by an active operation determining unit 26. The driving support changing unit 327 receives a determination signal corresponding to the determination result on the active operation from the active operation determining unit 26. The driving support changing unit 327 changes the content of the driving support by the supporting device 3 based on the input determination signal. The driving support changing unit 327 changes the content of the driving support of S & S carried out by the driving support changing unit 327 between the case in which the active operation determining unit 26 determines that the active operation is carried out by the driver and the case in which the active operation determining unit 26 determines that the passive operation is carried out by the driver.

Here, the driving support changing unit 327 outputs a control signal for permitting the start of the engine 50 to the engine restart requesting unit 328 when it is determined that the active operation is carried out. The driving support changing unit 327 accordingly changes to the driving support of starting the engine 50. The engine restart requesting unit 328 grasps the state of the engine 50, and then starts the engine 50 if the engine 50 is in the stopped state when it is determined that the active operation is carried out.

On the other hand, the driving support changing unit 327 outputs a control signal for not permitting the start of the engine 50 to the engine restart requesting unit 328 when it is determined that the passive operation is carried out. The driving support changing unit 327 accordingly changes to the driving support of not starting the engine 50. The engine restart requesting unit 328 grasps the state of the engine 50, and then maintains the stopped state of the engine 50 if the engine 50 is in the stopped state when it is determined that the passive operation is carried out.

That is, the driving support changing unit 327 changes the content of the driving support so as to permit the driving support of starting the engine 50 when the active operation is carried out, and limit the driving support of starting the engine 50 when the passive operation is carried out. As a result, the drive supporting device 301 can realize the driving support reflecting the intention of the driver according to the respective cases such as when the active operation is carried out, and when the passive operation is carried out.

Here, FIG. 17, FIG. 18, and FIG. 19 are views describing the determination on the intention of the driver based on the steering torque, the determination on the intention of the driver based on the steering speed, and the determination on the intention of the driver based on the steering power. In FIG. 17, FIG. 18, and FIG. 19, the horizontal axis is the feedback (typically, corresponds to a self-aligning torque) of a steering 4 that changes in accordance with the road surface environment (road surface $\mu$) and the assist situation. Furthermore, the vertical axis of FIG. 17 is the steering torque T, the vertical axis of FIG. 18 is the steering speed $\theta'$, and the vertical axis of FIG. 19 is the steering power P1.

As illustrated in FIG. 17 and FIG. 18, when the intention of the driver is determined based on simply the simple body of the steering torque T or the simple body of the steering speed $\theta'$, the steering torque T and the steering speed $\theta'$ tend to fluctuate according to the feedback of the steering 4. For example, when the road surface $\mu$ is low, that is, the feedback of the steering 4 is light, steering is carried out with a relatively small torque but the steering speed tends to become relatively fast. Thus, in such a case, the determination result of the intention of the driver (active operation/passive operation) may be influenced by the road surface environment and the assist situation.

As illustrated in FIG. 19, on the other hand, when the intention of the driver is determined based on the steering power P1 and the like, the steering power P1 is not influenced by the road surface environment, the assist situation and the like, and does not fluctuate according to the feedback of the steering 4, Thus, the ECU 320 can accurately determine the intention of the driver (active operation/passive operation) without being subjected to such influences by determining the active operation/passive operation in the above manner.

One example of the control by the ECU 320 and the engine restart requesting unit 328 will be described next with reference to FIG. 20. It is to be noted that the redundant description between FIG. 20 and FIG. 6 will be omitted as much as possible here.

When it is determined that the active operation is carried out by the driver in step ST4 (step ST4: Yes), the driving support changing unit 327 of the ECU 320 changes the support content by the supporting device 3 to become the driving support corresponding to the active operation on the steering 4. In this case, the driving support changing unit 327 changes the content of the driving support so as to allow the driving support of starting the engine 50. The engine restart requesting unit 328 then determines whether or not the engine 50 is stopped (step ST305).

When it is determined that the engine 50 is stopped in step ST305 (step ST305: Yes), the engine restart requesting unit 328 outputs an engine restart request to the engine 50 to actually restart the engine 50 (step ST306), terminates the control period of this time and proceeds to the control period of next time.

When it is determined that the engine 50 is not stopped in step ST305, that is, the engine 50 is consuming the fuel and is in operation (step ST305: No), the engine restart requesting unit 328 terminates the control period of this time and proceeds to the control period of next time.

When it is determined that the active operation is not carried out by the driver in step ST4, that is, the passive operation is carried out (step ST4: No), the driving support changing unit 327 of the ECU 320 changes the support content by the supporting device 3 to become the driving support corresponding to the passive operation on the steering 4, terminates the control period of this time and proceeds to the control period of next time. In this case, the driving support changing unit 327 changes the content of the driving support so as to limit the driving support of starting the engine 50.

The drive supporting device 301 configured as described above changes the content of the driving support by the supporting device 3 between the case in which a steering power corresponding to a product of a parameter associated with a steering angle and a parameter associated with a steering torque is greater than or equal to a reference value set in advance, and the case in which the steering power is smaller than the reference value. Thus, for example, the drive supporting device 301 can change the content of the driving support by the supporting device 3 between the case in which the active operation is carried out by the driver and the case in which the passive operation is carried out by the driver. The drive supporting device 301, for example, provides the driving support corresponding to the active operation when the steering power is greater than or equal to the power reference value, and provides the driving support corresponding to the passive operation when the steering power is smaller than the power reference value. As a result, the drive supporting device 301 can realize the driving support reflecting the intention of the driver according to the respective cases such as when the active operation is carried out, and when the passive operation is carried out. That is, the drive supporting device 301 can determine, in a distinguished manner, the active operation and the passive operation reflecting the operational intention of the driver based on the steering power and the like, and reflect the determined operational intention of the driver in the driving support to carry out the driving support in which the sense of discomfort is small for the driver.

The drive supporting device 301 of the present embodiment can carry out the engine start support in which the sense of discomfort is small for the driver by reflecting the determined operational intention of the driver in the S & S driving support of the drive system. Here, when it can be determined that the active operation is carried out, the drive supporting device 301 can carry out the drive support of simulating the active intention of the driver to start the engine 50 with the active operation by the driver and automatically starting the engine 50. As a result, the drive supporting device 1 can realize the engine start following the operational intention of the driver.

The drive supporting device 301, the ECU 320 according to the embodiment described above can determine the intention of the driver based on the steering power, realize the driving support reflecting the intention of the driver, and for example, carry out the driving support in which the sense of discomfort is small for the driver.

It is to be noted that the drive supporting device, the operation detecting device, and the controller according to the embodiments of the present invention described above are not limited to the embodiments described above, and various changes can be made within the scope of the claims. The drive supporting device, the operation detecting device, and the controller according to the present embodiments may be configured by appropriately combining the constituent elements of each embodiment described above.

In the above description, the controller of the drive supporting device and the determining device of the operation detecting device have been described as the ECU that controls each unit of the vehicle, but are not limited thereto, and for example, may be respectively configured separate from the ECU and configured to exchange information such as detection signals, drive signals, and control commands with the ECU.

In the above description, the supporting device has been described as being configured to include the steering actuator that operates according to the steering operation on the steering member or the operation unit that carries out the driving support by automatically starting and stopping the power source that generates power for causing the vehicle to travel, but is not limited thereto. The supporting device may, for example, be configured to include a braking actuator capable of adjusting the braking force of the vehicle 2, a posture/behavior actuator capable of adjusting the posture/behavior and the like of the vehicle 2, a suspension actuator of the vehicle 2, and the like. In this case, the controller may reflect the determination result of the active operation and the passive operation based on the steering power in the driving support of the braking system, the posture/behavior stabilizing system, the suspension system and the like of the vehicle 2.

In the above description, the steering device has been described as the column assist type column EPS device, but is not limited thereto and for example any of a pinion assist type, and a rack assist type is also applicable.

REFERENCE SIGNS LIST 1, 201, 301 DRIVE SUPPORTING DEVICE
2 VEHICLE
3 SUPPORTING DEVICE
4 STEERING (STEERING MEMBER)
5 SHAFT (STEERING SHAFT PORTION)
6 GEAR MECHANISM
7 TIE ROD
8 EPS DEVICE (STEERING ACTUATOR)
10 STEERING ANGLE SENSOR (STEERING ANGLE DETECTING DEVICE)
11 TORQUE SENSOR (TORQUE DETECTING DEVICE)
12 ROTATION ANGLE SENSOR
13 VEHICLE SPEED SENSOR
14 YAW RATE SENSOR
20, 220, 320 ECU (CONTROLLER, DETERMINING DEVICE)
30 STEERING DEVICE
40 STEERING WHEEL
50 ENGINE (POWER SOURCE)
328 ENGINE RESTART REQUESTING UNIT (OPERATION UNIT)

The invention claimed is:

1. A drive supporting device comprising:
a supporting device mounted on a vehicle and capable of executing driving support in the vehicle;
a steering angle detecting device configured to detect a steering angle of a steering member of the vehicle;
a torque detecting device configured to detect a torque acting on a steering shaft portion that rotates with the steering member; and
a controller configured to control the supporting device, wherein
the supporting device includes a steering actuator that operates according to a steering operation of the steering member, and
when a steering power is greater than or equal to a power reference value set in advance, the controller controls the steering actuator and reduces a dumping force generated by the steering actuator compared to when the steering power is smaller than the power reference value, wherein the steering power is based on a sum of (i) a product of a steering speed corresponding to a steering angle detected by the steering angle detecting device and the torque detected by the torque detecting device, and (ii) a product of the steering angle detected by the steering angle detecting device and a torque differential value corresponding to the torque detected by the torque detecting device.

2. The drive supporting device according to claim 1, wherein
the controller changes a control amount of the steering actuator based on the steering power and a vehicle speed of the vehicle.

3. The drive supporting device according to claim 1, wherein
at the time a period in which an amplitude of the steering power is greater than or equal to an amplitude threshold value defined in advance has continued longer than or equal to a predetermined period set in advance, the controller increases at least one of an assist force generated by the steering actuator, a dumping force generated by the steering actuator, and a frictional force generated by the steering actuator compared to at the time the amplitude of the steering power is smaller than the amplitude threshold value or at the time a period in which the amplitude of the steering power is greater than or equal to the amplitude threshold value is shorter than the predetermined period.

4. The drive supporting device according to claim 3, wherein
the amplitude of the steering power is calculated based on a difference of a maximum value and a minimum value of the steering power, an absolute value of the maximum value of the steering power, or an absolute value of the minimum value of the steering power.

5. The drive supporting device according to claim 1, wherein
the controller keeps an assist correction amount, which is a correction amount of the assist force generated by the steering actuator, or a dumping correction amount, which is a correction amount of the dumping force generated by the steering actuator, constant at the time an absolute value of the steering power is smaller than or equal to a predetermined power set in advance, and changes the assist correction amount or the dumping correction amount with increase in the absolute value of the steering power at the time the absolute value of the steering power is greater than the predetermined power.

6. The drive supporting device according to claim 1, wherein
the supporting device is configured to include an operation unit that carries out the driving support by automatically starting and stopping a power source that generates power for causing the vehicle to travel, and
the controller carries out the driving support of starting the power source at the time the steering power is greater than or equal to the power reference value, and does not carry out the driving support of starting the power source at the time the steering power is smaller than the power reference value.

7. The drive supporting device according to claim 1, wherein
the controller changes the content of the driving support by the supporting device based on a steering work amount corresponding to a product of a parameter associated with the steering angle detected by the steering angle detecting device and a parameter associated with the torque detected by the torque detecting device.

8. The drive supporting device according to claim 1, wherein
the controller provides driving support corresponding to an active operation on the steering member at the time the steering power is greater than or equal to the power reference value, and provides driving support corresponding to a passive operation on the steering member at the time the steering power is smaller than the power reference value.

9. An operation detecting device comprising:
a steering angle detecting device configured to detect a steering angle of a steering member of a vehicle;
a torque detecting device configured to detect a torque acting on a steering shaft portion that rotates with the steering member; and
a determining device configured to determine an active operation on the steering member and a passive operation on the steering member on the basis of a steering power based on a sum of (i) a product of a steering speed corresponding to the steering angle detected by the steering angle detecting device and the torque detected by the torque detecting device, and (ii) a product of the steering angle detected by the steering angle detecting device and a torque differential value corresponding to the torque detected by the torque detecting device.

10. The operation detecting device according to claim 9, wherein
the active operation includes a steering operation in which a driver attempts to move the vehicle to a target position, and
the passive operation includes a steering operation in which the driver attempts to maintain the vehicle at a target position with respect to disturbance, a hands free operation, or a steering-hold operation.

11. The operation detecting device according to claim 9, wherein
the determining device determines correction steering with respect to disturbance at the time a period in which an amplitude of the steering power is greater than or equal to an amplitude threshold value defined in advance has continued longer than or equal to a predetermined period set in advance.

12. The operation detecting device according to claim 9, wherein
the determining device determines the active operation and the passive operation based on a steering work amount corresponding to a product of a parameter associated with the steering angle detected by the steering angle detecting device and a parameter associated with the torque detected by the torque detecting device.

13. The operation detecting device according to claim 12, wherein
the steering work amount is calculated based on a product of the steering angle calculated according to a yaw rate of the vehicle as the parameter associated with the steering angle detected by the steering angle detecting device, and the torque detected by the torque detecting device, and
the determining device determines the active operation and the passive operation based on the steering work amount.

14. The operation detecting device according to claim 12, wherein
the steering work amount is calculated based on a product of a steering angle corresponding to a difference of the steering angle detected by the steering angle detecting device and a steering angle at time of straight-ahead travelling of the vehicle, or a steering angle corresponding to a difference of the steering angle detected by the steering angle detecting device and a steering angle calculated according to the yaw rate of the vehicle, as the parameter associated with the steering angle detected by the steering angle detecting device, and the torque detected by the torque detecting device, and
the determining device determines the correction steering with respect to the disturbance based on the steering work amount.

15. A controller configured to be mounted on a vehicle and control a supporting device capable of executing driving support in the vehicle, wherein
the supporting device is configured to include a steering actuator that operates according to a steering operation on the steering member, and when a steering power is greater than or equal to a power reference value set in advance, the controller controls the steering actuator and reduces a dumping force generated by the steering actuator compared to when the steering power is smaller than the power reference value, wherein the steering power is based on a sum of (i) a product of a steering speed corresponding to a steering angle of a steering member of the vehicle and a torque acting on a steering shaft portion that rotates with the steering member, and (ii) a product of the steering angle of the steering member and a torque differential value corresponding to the torque acting on the steering shaft portion.

16. The drive supporting device according to claim 1, wherein
the controller changes a control amount of the steering actuator based on the steering power and a vehicle speed of the vehicle.

17. The drive supporting device according to claim 1, wherein
at the time a period in which an amplitude of the steering power is greater than or equal to an amplitude threshold value defined in advance has continued longer than or equal to a predetermined period set in advance, the controller increases at least one of an assist force generated by the steering actuator, a dumping force generated by the steering actuator, and a frictional force generated by the steering actuator compared to at the time the amplitude of the steering power is smaller than the amplitude threshold value or at the time a period in which the amplitude of the steering power is greater than or equal to the amplitude threshold value is shorter than the predetermined period.

* * * * *